United States Patent
Jiang et al.

(10) Patent No.: US 10,851,324 B2
(45) Date of Patent: Dec. 1, 2020

(54) GRAFTED POLYMER WITH SOOT HANDLING PROPERTIES

(71) Applicant: Afton Chemical Corporation, Richmond, VA (US)

(72) Inventors: Sheng Jiang, Glen Allen, VA (US); Arturo Carranza, Henrico, VA (US)

(73) Assignee: Afton Chemical Corporation, Richmond, VA (US)

( * ) Notice: Subject to any disclaimer, the term of this patent is extended or adjusted under 35 U.S.C. 154(b) by 125 days.

(21) Appl. No.: 15/905,965

(22) Filed: Feb. 27, 2018

(65) Prior Publication Data

US 2019/0264126 A1    Aug. 29, 2019

(51) Int. Cl.

| | |
|---|---|
| *C10M 149/10* | (2006.01) |
| *C08F 255/02* | (2006.01) |
| *C08F 8/32* | (2006.01) |
| *C10M 149/06* | (2006.01) |
| *C10N 20/04* | (2006.01) |
| *C10N 30/04* | (2006.01) |
| *C10N 60/00* | (2006.01) |

(52) U.S. Cl.
CPC ............ *C10M 149/10* (2013.01); *C08F 8/32* (2013.01); *C08F 255/02* (2013.01); *C10M 149/06* (2013.01); *C10M 2205/022* (2013.01); *C10M 2205/024* (2013.01); *C10M 2205/028* (2013.01); *C10M 2209/084* (2013.01); *C10M 2209/086* (2013.01); *C10M 2217/06* (2013.01); *C10N 2020/04* (2013.01); *C10N 2030/04* (2013.01); *C10N 2030/041* (2020.05); *C10N 2060/09* (2020.05)

(58) Field of Classification Search
CPC ............ C08F 255/02; C10N 2230/041; C10N 2030/04; C10M 2217/06
See application file for complete search history.

(56) References Cited

U.S. PATENT DOCUMENTS

| | | | |
|---|---|---|---|
| 3,516,944 A * | 6/1970 | Litt | ........................ C06B 23/001 524/386 |
| 4,049,564 A | 9/1977 | Ryer et al. | |
| 4,102,798 A | 7/1978 | Ryer et al. | |
| 4,113,639 A | 9/1978 | Lonstrup et al. | |
| 4,169,836 A | 10/1979 | Ryer et al. | |
| 4,678,833 A | 7/1987 | McCreedy et al. | |

(Continued)

FOREIGN PATENT DOCUMENTS

| | | |
|---|---|---|
| DE | 202006014282 | 12/2006 |
| DE | 102006059835 | 3/2008 |

(Continued)

OTHER PUBLICATIONS

European Search Report; dated Jun. 27, 2019 for EP Application No. 19158966.2.

*Primary Examiner* — Vishal V Vasisth
(74) *Attorney, Agent, or Firm* — Honigman LLP

(57) ABSTRACT

The present disclosure relates to oxazoline modified lubricant additives that have dispersant properties and lubricating oil compositions comprising said dispersant lubricant additives. The disclosure also relates to the use of lubricant compositions comprising the additives of the disclosure for improving the soot or sludge handling characteristics of an engine lubricant composition, while minimizing the deterioration of engine seals.

23 Claims, 1 Drawing Sheet

(56) References Cited

U.S. PATENT DOCUMENTS

| | | | |
|---|---|---|---|
| 4,702,854 A | 10/1987 | Snyder et al. | |
| 4,831,161 A | 5/1989 | Wang et al. | |
| 4,839,073 A | 6/1989 | Gutierrez et al. | |
| 4,938,880 A | 7/1990 | Waddoups et al. | |
| 5,049,290 A | 9/1991 | Emert et al. | |
| 5,063,262 A | 11/1991 | Hildebrand | |
| 5,075,383 A | 12/1991 | Migdal et al. | |
| 5,085,788 A | 2/1992 | Emert et al. | |
| 5,094,766 A * | 3/1992 | Kapuscinski | C10M 149/02 508/277 |
| 5,139,688 A | 8/1992 | Nalesnik | |
| 5,178,786 A | 1/1993 | Jahnke et al. | |
| 5,306,313 A | 4/1994 | Emert et al. | |
| 5,407,500 A | 4/1995 | Forsberg et al. | |
| 6,107,257 A | 8/2000 | Valcho et al. | |
| 6,172,015 B1 * | 1/2001 | Emert | C10L 1/1955 508/472 |
| 6,878,799 B2 | 4/2005 | He | |
| 7,214,653 B2 | 5/2007 | Yoneda et al. | |
| 7,943,141 B2 | 5/2011 | Harris et al. | |
| 8,158,748 B2 | 4/2012 | Dershem et al. | |
| 8,883,211 B2 | 11/2014 | Bentley et al. | |
| 8,927,469 B2 | 1/2015 | Mathur et al. | |
| 9,284,411 B2 | 3/2016 | Bentley et al. | |
| 9,944,755 B2 | 4/2018 | Yin et al. | |
| 2004/0048753 A1 | 3/2004 | Ritchie | |
| 2004/0259742 A1 | 12/2004 | Mishra | |
| 2006/0173135 A1 | 3/2006 | Devlin et al. | |
| 2008/0182768 A1 | 7/2008 | Devlin et al. | |
| 2009/0192061 A1 | 7/2009 | Boegner et al. | |
| 2009/0270531 A1 | 10/2009 | Ruhe, Jr. | |
| 2010/0160192 A1 | 6/2010 | Ruhe, Jr. | |
| 2012/0264665 A1 | 10/2012 | Wu et al. | |
| 2014/0107001 A1 | 4/2014 | Saccomando | |
| 2014/0187454 A1 | 7/2014 | Brewer | |
| 2016/0024252 A1 | 1/2016 | Yin et al. | |
| 2016/0152782 A1 | 6/2016 | Cammage et al. | |
| 2017/0175600 A1 | 6/2017 | Douglass | |
| 2017/0202971 A1 | 7/2017 | Yin et al. | |
| 2017/0275551 A1 | 9/2017 | Woodward et al. | |
| 2017/0275556 A1 | 9/2017 | Preston | |
| 2018/0016515 A1 | 1/2018 | Lagona | |
| 2018/0163153 A1 | 6/2018 | Cain et al. | |
| 2018/0371357 A1 | 12/2018 | Knapton | |
| 2019/0264126 A1 | 8/2019 | Jiang et al. | |

FOREIGN PATENT DOCUMENTS

| | | |
|---|---|---|
| EP | 0338672 A1 | 10/1989 |
| EP | 0552554 A1 | 7/1993 |
| EP | 1489281 | 12/2004 |
| EP | 1686141 | 8/2005 |
| EP | 2557144 | 2/2013 |
| GB | 1547980 A | 7/1979 |
| WO | 9039206 A1 | 5/1993 |
| WO | 2017192202 A1 | 11/2017 |

* cited by examiner

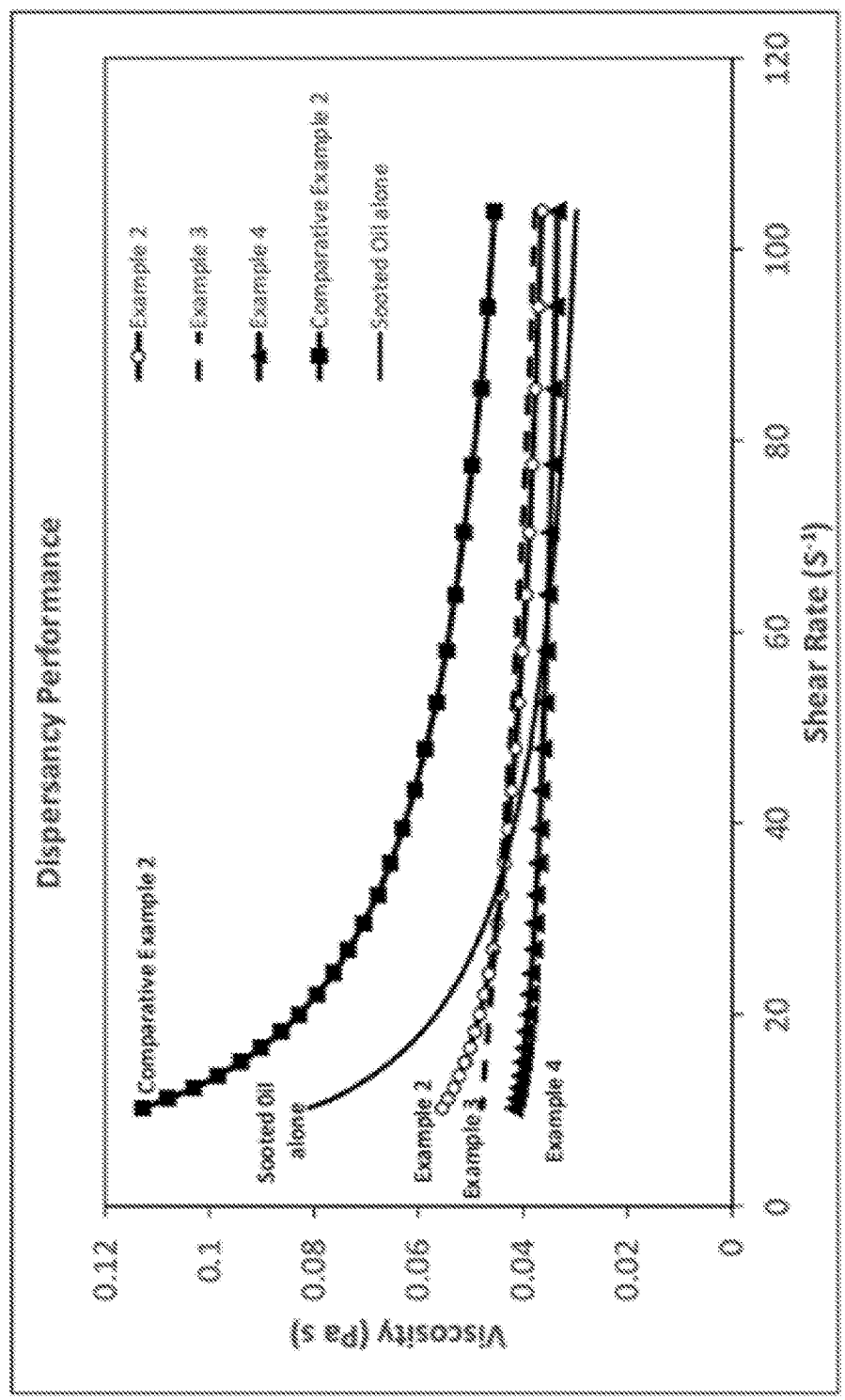

GRAFTED POLYMER WITH SOOT HANDLING PROPERTIES

TECHNICAL FIELD

The present disclosure relates to oxazoline modified lubricant additives such as dispersants and dispersant viscosity index modifiers and lubricating oil compositions comprising such additives. The disclosure also relates to the use of lubricant compositions comprising the additives herein for improving the soot or sludge handling characteristics of an engine lubricant composition and while minimizing the deterioration of engine's elastomer compatibility.

BACKGROUND

An engine lubricant provides increased engine protection tending to improve fuel economy and reduce emissions. However, it is generally undesired to sacrifice engine protection and lubricating properties to achieve the benefits of improved fuel economy and reduced emissions, and most lubricants often find a balance behind such properties. For example, an increase in the amount of friction modifiers in the lubricant may be beneficial for fuel economy purposes but may lead to reduced ability of the lubricant to handle wear stresses imposed by external engine contaminants, such as water. Likewise, an increase in the amount of anti-wear agent in the lubricant may provide improved engine protection against wear, but could also reduce emissions through various mechanisms, such as being detrimental to catalyst performance.

Likewise, soot and sludge handling components of the lubricant must achieve a similar balance. A dispersant or dispersant viscosity modifier (DVM), for example, can provide excellent soot/sludge handling properties in engine oils, particularly in heavy duty diesel oils, while still contributing to the overall viscometric performance of a finished oil. A DVM can be tailored to fulfill multiple roles in finished oil formulations including those of antioxidants, friction/antiware agents, and, in some cases, detergents. This ample versatility allows formulators a greater windows to reduce or increase the treat rate of certain components in finished formulations and to optimize overall engine oil performance. DVMs often include aryl amines and/or other amine moieties that can provide improved anti-ware and dispersant properties. However, aryl amines as well as other primary and/or secondary amines in some instances negatively affect an engine's elastomer compatibility. In the past, a variety of borates, anhydrides, and carboxylic acids have been used to attenuate the effects of unprotected amines. In some instances, aryl amines benefit from having sterically hindered amine moieties, and therefore have a reduced negative impact on the longevity of fluoro-elastomer seals but may still impact seal quality and longevity depending on the treat rate of such amine functionalized DVM.

BRIEF DESCRIPTION OF THE FIGURES

FIG. 1 is a graph showing the dispersant performance of example polymers in a lubricating oil.

SUMMARY

In one aspect or embodiment, a multi-functional olefin copolymer viscosity modifier comprising the reaction product of (i) an amine-functionalized acylated olefin copolymer including one or more primary and/or secondary aryl amines, one or more primary and/or secondary alkyl amines, or mixtures thereof and (ii) an oxazoline or derivative thereof; and wherein the oxazoline or derivative thereof is a capping agent for a nitrogen of the primary and/or secondary amines. In one approach, the amines are the one or more primary and/or secondary aryl amines.

The multi-functional olefin copolymer viscosity modifier of the previous paragraph can be combined with one or more optional features either individually or in combination. These additional optional features may include wherein the one or more primary and/or secondary aryl amines include a sterically hindered nitrogen; and/or wherein the oxazoline or derivative thereof is selected from 2-phenyl-2-oxazoline; 2-ethyl-2 oxazoline; 2-methyl-2-oxazoline; 2-benzyl-4,4-dimethyl-2-oxazoline; 2-ethyl-4,4-dimethyl-2 oxazoline; 2,4,4-trimethyl-2-oxazoline; 4,4-dimethyl-2-oxazoline; 2,4,5-trimethyl-3-oxazoline; dimethoxyphenyl)-4,4-dimethyl-2-oxazoline; 2-[1-(hydroxymethyl)ethyl]oxazoline; mixtures thereof, and derivatives thereof; and/or wherein the oxazoline or derivative thereof includes pendant groups in positions 2, 4, and 5 or combinations thereof and wherein the pendant groups are selected from heterocyclic, aromatics, hydrocarbyl groups of $C_1$ to $C_{32}$, and mixtures thereof; and/or wherein the reaction product has a capping ratio of about 5 to about 50 percent of the primary and/or secondary amines; and/or wherein the amine-functionalized acylated olefin copolymer has about 0.1 to about 0.8 carboxylic groups per about 1000 number average molecular weight units of the olefin copolymer and wherein the olefin copolymer has a number average molecular weight of about 5,000 to about 150,000; and/or wherein the olefin copolymer is a copolymer of ethylene and one or more of C3 to C18 alpha-olefins; and/or wherein the amine-functionalization is obtained from an N-arylphenylenediame of the formula

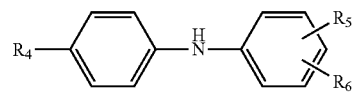

$R_4$ is hydrogen, —NH-aryl, —NH-arylalkyl, —NH-alkyl, or a branched or straight chain radical having from 4 to 24 carbon atoms that can be alkyl, alkenyl, alkoxyl aralkyl, alkaryl, hydroxyalkyl or aminoalkyl; $R_5$ is —$NH_2$, $CH_2$—$(CH_2)_n$—$NH_2$, $CH_2$-aryl-$NH_2$, in which n is an integer from 1 to 10; and $R_6$ is hydrogen, alkyl, alkenyl, alkoxyl, aralkyl, alkaryl having from 4 to 24 carbon atoms; and/or wherein the N-arylphenylenediame is selected from N-phenyl-1,4-phenylenediamine; N-phenyl-1,3-phenylendiamine; N-phenyl-1,2-phenylenediamine; and mixtures thereof; and/or wherein the acylated olefin copolymer is derived from copolymer of ethylene and one or more C3 to C18 alpha-olefins and a grafted ethylenically unsaturated carboxylic acid material having at least one ethylenic bond and at least one carboxylic acid group or anhydride group thereof or a polar group that is convertible into a carboxyl group reacted with the olefin copolymer; and/or wherein the ethylenically unsaturated carboxylic acid material is selected from acrylic acid, methacrylate acid, cinnamic acid, crotonic acid, maleic acid, fumaric acid or anhydride derivatives thereof.

In another aspect or embodiment, the present disclosure also provides for an additive concentrate comprising the multi-functional olefin copolymer viscosity modifier including any of the features of the previous two paragraphs.

In another aspect or embodiment, the present disclosure provides for the use of the multi-functional olefin copolymer viscosity modifier or additive concentrate thereof described in the previous three paragraphs for improving the soot or sludge handling characteristics of an engine lubricant while minimizing the deterioration of elastomer compatibility.

In yet another aspect or embodiment, the present disclosure further provides for a lubricant including a major amount of base oil of lubricating viscosity and a minor amount of a multi-functional olefin copolymer viscosity modifier. The multi-functional olefin copolymer viscosity modifier includes the reaction product of (i) an amine-functionalized acylated olefin copolymer including one or more primary and/or secondary aryl amines, one or more primary and/or secondary alkyl amines or mixtures thereof and (ii) an oxazoline or derivative thereof; and wherein the oxazoline or derivative thereof is a capping agent for a nitrogen of the primary and/or secondary amines. In one approach, the amines are the one or more primary or secondary alkyl amines.

The lubricant of the previous paragraph can be combined with one or more optional features either individually or in combination. These additional optional features may include wherein the one or more primary and/or secondary aryl amines include a sterically hindered nitrogen; and/or wherein the oxazoline or derivative thereof is selected from 2-phenyl-2-oxazoline; 2-ethyl-2 oxazoline; 2-methyl-2-oxazoline; 2-benzyl-4,4-dimethyl-2-oxazoline; 2-ethyl-4,4-dimethyl-2 oxazoline; 2,4,4-trimethyl-2-oxazoline; 4,4-dimethyl-2-oxazoline; 2,4,5-trimethyl-3-oxazoline; 2-(2,6-dimethoxyphenyl)-4,4-dimethyl-2-oxazoline; 2-[1-(hydroxymethyl)ethyl]oxazoline; mixtures thereof, and derivatives thereof; and/or wherein the oxazoline or derivative thereof includes pendant groups in positions 2, 4, and 5 or combinations thereof and wherein the pendant groups are selected from heterocyclic, aromatics, hydrocarbyl groups $C_1$ to $C_{32}$, and mixtures thereof; and/or wherein the reaction product has a capping ratio of about 5 to about 50 percent of the primary and/or secondary amines; and/or wherein the amine-functionalized acylated olefin copolymer has about 0.1 to about 0.8 carboxylic groups per about 1000 number average molecular weight units of the olefin copolymer and wherein the olefin copolymer has a number average molecular weight of about 5,000 to about 150,000; and/or wherein the olefin copolymer is a copolymer of ethylene and one or more of C3 to C18 alpha-olefins; and/or wherein the amine-functionalization is obtained from an N-arylphenylenediame of the formula

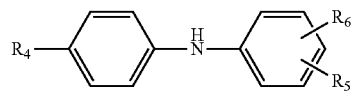

$R_4$ is hydrogen, —NH-aryl, —NH-arylalkyl, —NH-alkyl, or a branched or straight chain radical having from 4 to 24 carbon atoms that can be alkyl, alkenyl, alkoxyl aralkyl, alkaryl, hydroxyalkyl or aminoalkyl; $R_5$ is —NH$_2$, CH$_2$—(CH$_2$), —NH$_2$, CH$_2$-aryl-NH$_2$, in which n is an integer from 1 to 10; and $R_6$ is hydrogen, alkyl, alkenyl, alkoxyl, aralkyl, alkaryl having from 4 to 24 carbon atoms; and/or wherein the N-arylphenylenediame is selected from N-phenyl-1,4-phenylenediamine; N-phenyl-1,3-phenylendiamine; N-phenyl-1,2-phenylenediamine; and mixtures thereof; and/or wherein the acylated olefin copolymer is derived from copolymer of ethylene and one or more C3 to C18 alpha-olefins and a grafted ethylenically unsaturated carboxylic acid material having at least one ethylenic bond and at least one carboxylic acid group or anhydride group thereof or a polar group that is convertible into a carboxyl group reacted with the olefin copolymer; and/or wherein the ethylenically unsaturated carboxylic acid material is selected from acrylic acid, methacrylate acid, cinnamic acid, crotonic acid, maleic acid, fumaric acid or anhydride derivatives thereof.

DETAILED DESCRIPTION

Engine or crankcase lubricant compositions are used in vehicles containing spark ignition and compression ignition engines. Such engines may be used in automotive, truck, and/or train applications, to suggest but a few examples, and may be operated on fuels including, but not limited to, gasoline, diesel, alcohol, compressed natural gas, and the like. The lubricants or lubricant compositions herein may be suitable for use as engine or crankcase lubricants, such as automotive crankcase lubricants that, in some circumstances, meet or exceed the ILSAC GF-5 and/or API CJ-4 lubricant standards.

As noted in the background, engine oils commonly include many additives. Dispersants and dispersant viscosity index improvers are common additives in engine oil to help by dispersing sludge, carbon, soot, oxidation products, and other deposit precursors. Such additives aid in keeping engine parts clean, prolonging engine life and helping to maintain proper emissions and good fuel economy. The result is reduced deposit formation, less oil oxidation, and less viscosity increase. In some approaches, the dispersants or dispersant viscosity modifiers accomplish this by inhibiting particle-to-particle aggregation. Accordingly, the soot and sludge handling properties of the lubricant are generally improved as the amount of dispersant or dispersant viscosity modifier in the lubricant composition is increased, but increasing the amount of those additives can, in some instances, adversely affect elastomer compatibility. Described herein, on the other hand, are lubricant additives with dispersant properties, and lubricating oils including such additives that have good soot handling properties and/or viscosity modifying properties and, at the same time, are compatible with fluoro elastomers as compared to prior lubricant additives.

Turning to more of the specifics, a lubricant additive, such as multi-functional viscosity modifiers or dispersants are described herein that provides dispersant and/or viscosity modification while still being friendly to engine elastomers. In one aspect, the lubricant additive is a multi-functional viscosity modifier such as a multi-functional olefin copolymer viscosity modifier including the reaction product of (i) an amine-functionalized acylated olefin copolymer including one or more primary and/or secondary aryl amines and, optionally, one or more primary and/or secondary alkyl amines and (ii) an oxazoline or derivative thereof; where the oxazoline or derivative thereof is a capping agent for a nitrogen of the primary and/or secondary amines.

The oxazoline capped dispersant viscosity index modifiers or dispersants herein reduce the negative impact of amine-containing additives on elastomers and other engine seals by converting the primary and secondary amines (alkyl and/or arylamines) of the additives to tertiary amines. In some instances, the chemical protection of the amines may convert a sterically hindered primary and/or secondary amine to a tertiary amine (referred to herein as "capping" the nitrogen atom). As discussed more below, oxazolines may be reacted with sterically hindered aromatic nitrogen, such as nitrogen found in diphenylamine, to reduce the negative impact of the aryl amines on seals while not significantly impacting either dispersant and/or viscosity index properties of the additive. In other approaches, the oxazoline may also react with primary and/or secondary alkyl amines to further reduce the negative impact of such alkyl amines on engine elastomer compatibility. Accordingly, oxazolines provide a desirable route to address this challenge due to their discovered high chemical reactivity and specificity in the context of lubricant additives.

Disclosed herein is the use of oxazolines as a chemical modification to lubricant additives that tends to grant additional fluoro elastomer seal protection and unexpectedly improved dispersant performance, such as dispersant olefin copolymer viscosity modifiers or hydrocarbyl substituted dicarboxylic anhydrides or derivatives thereof. The present disclosure provides a method of capping sterically hindered and/or exposed primary and/or secondary amines through a simple and rapid one pot reaction with oxazolines. It has also been demonstrated that while capping arylamines with certain oxazolines, an unexpected dispersancy boost at low treat rate performance is possible. A wide variety of oxazoline derivatives are compatible with the present disclosure, as described below. Each component will be described further below.

Oxazoline Capping Agent:

In one aspect, the lubricant additives herein include an oxazoline-derived capping agent such as an oxazoline or derivative thereof of Formula I

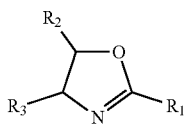

(Formula I)

wherein $R_1$ and $R_3$ are each independently selected from the group consisting of hydrogen, halo, nitro, cyano, a $C_1$ to $C_{32}$ aliphatic group, phenyl, naphthyl, a 3-7 membered heterocyclic group, a 5-6 membered heteroaryl group, and wherein up to 5 carbons of said $C_1$ to $C_{32}$ aliphatic group are independently and optionally replaced with a bivalent group selected from —O—, —NH—, —N($C_{1-4}$ alkyl)-, —C(O)—, —C(O)O—, —C(O)NH—, —C(O)N($C_{1-4}$ alkyl)-, and wherein each $R_1$ and $R_3$ is independently and optionally substituted with up to three substituents selected from $C_1$ to $C_6$ alkyl, phenyl, naphthyl, a 3-7 membered heterocyclic group, a 5-6 membered heteroaryl group, halo, nitro, and cyano; and $R_2$ is hydrogen, halo, or a $C_{1-4}$ alkyl.

In another embodiment, $R_1$ is selected from the group consisting of halo, nitro, cyano, methyl, ethyl, propyl, isopropyl, butyl, isobutyl, sec-butyl, tert-butyl, n-pentyl, n-heptyl, 2-ethylhexyl, phenyl, furyl, thiophenyl, 2H-pyrrolyl, pyrrolyl, oxazolyl, thazolyl, imidazolyl, pyrazolyl, isoxazolyl, isothiazolyl, 1,3,4-thiadiazolyl, 2H-pyranyl, 4-H-pranyl, pyridyl, pyridazyl, pyrimidyl, pyrazolyl, pyrazyl, and 1,3,5-triazyl, optionally substituted with up to three substituents selected from $C_1$ to $C_6$ alkyl, phenyl, halo, nitro, and cyano.

In some approaches, $R_1$ is ethyl or phenyl, or $R_1$ may be hydrogen. In some approaches, $R_2$ is hydrogen. In some other embodiments, $R_3$ is hydrogen. In some further embodiments, $R_3$ and $R_2$ are both hydrogen. In one further embodiment, $R_1$ is ethyl or phenyl and $R_3$ and $R_2$ are both hydrogen.

In other approaches, the oxazoline or derivative thereof suitable for a capping agent herein may be selected from 2-phenyl-2-oxazoline; 2-ethyl-2 oxazoline; 2-methyl-2-oxazoline; 2-benzyl-4,4-dimethyl-2-oxazoline; 2-ethyl-4,4-dimethyl-2 oxazoline; 2,4,4-trimethyl-2-oxazoline; 4,4-dimethyl-2-oxazoline; 2,4,5-trimethyl-3-oxazoline; dimethoxyphenyl)-4,4-dimethyl-2-oxazoline; 2-[1-(hydroxymethyl)ethyl]oxazoline; mixtures thereof, and derivatives thereof. In yet other approaches, the oxazoline or derivative thereof includes pendant groups in positions 2, 4, and 5 or combinations thereof wherein the pendant groups are selected from heterocyclic, aromatics, hydrocarbyl groups of $C_1$ to $C_{32}$, and mixtures thereof.

In some approaches, the lubricant additives herein may have a capping ratio of about 5 to about 70 percent of the primary and/or secondary amines (alkyl and/or aryl), in other approaches, about 5 to about 50 percent, and in yet further approaches, about 7 to about 35 percent capping. As used herein, a capping ratio is the percent of primary or secondary amines (alkyl and/or aryl) that have been capped or reacted with at least the oxazoline or derivative thereof. In some approaches, a molar ratio of the oxazoline or derivative thereof with active amines (that is primary and/or secondary alkyl or aryl amines) is about 5:1 to about 3:1, in other approaches, about 2:1 to about 1.5:1; and in yet further approaches, about 1:2 to about 1:4. In further approaches, a molar ratio of oxazoline to active amines is about 1:1. Percent capping is determined by measuring the nitrogen concentration of the polymer before and after the capping reaction using known nitrogen measurement techniques. In some approaches, the amines may also be capped with other compounds such as maleic anhydride and the like.

Amine Functionalization:

The lubricant additives of the present disclosure are also amine-functionalized. In one approach, the lubricant additive may be a dispersant viscosity modifier such as an amine-functionalized acylated olefin copolymer described below. The amine functionalization may include one or more primary and/or secondary aryl amines and, optionally, one or more primary and/or secondary alkyl amines.

In one aspect of this approach, the lubricant additives of the present disclosure are functionalized with an amine-containing moiety of Formula II

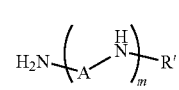

(Formula II)

wherein A is a bivalent phenyl group, optionally substituted with up to four $C_{1-6}$ alkyl substituents; R' is hydrogen, $C_{1-6}$ alkyl, or phenyl, wherein the alkyl and phenyl group are each optionally and independently substituted with up to three instances of a chemical moiety independently selected from the group consisting of halo, nitro, cyano, —C(O)($C_{1-4}$ alkyl), benzyl, benzoyl, and $C_{1-4}$ alkyl; and m is an integer from 1 to 10.

In one embodiment of the above aspect, A may be a moiety selected from

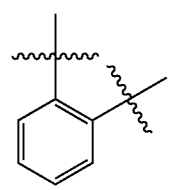

(A1)

(A2)

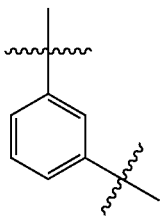

(A3)

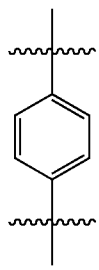

each of which is optionally substituted with up to four $C_{1-6}$ alkyl substituents. In a further embodiment, A is A3, optionally substituted with up to four $C_{1-6}$ alkyl substituents. In still a further embodiment, A is unsubstituted.

In another embodiment, R' is methyl, ethyl, propyl, isopropyl, butyl, or tert-butyl. In another embodiment, R' is phenyl, which is optionally substituted with up to three instances of a chemical moiety independently selected from the group consisting of halo, nitro, cyano, —C(O)($C_{1-4}$ alkyl), benzyl, benzoyl, and $C_{1-4}$ alkyl. In a further embodiment, R' is phenyl, which is optionally substituted with halo, $C_{1-4}$ alkyl, or phenyl. In still a further embodiment, R' is unsubstituted phenyl.

In some embodiments, m is an integer from 1 to 5. In some other embodiments, m is an integer from 1 to 3. In a further embodiment, m is 1. In one embodiment, m is 1; A is A3, and R' is unsubstituted phenyl.

In yet other approaches or embodiment, any of the lubricant additives herein include amine-functionalization obtained from an N-arylphenylenediame of the Formula III

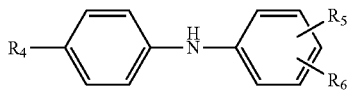

(Formula III)

wherein $R_4$ is hydrogen, —NH-aryl, —NH-arylalkyl, —NH-alkyl, or a branched or straight chain radical having from 4 to 24 carbon atoms that can be alkyl, alkenyl, alkoxyl aralkyl, alkaryl, hydroxyalkyl or aminoalkyl; $R_5$ is —NH$_2$, CH$_2$—(CH$_2$), —NH$_2$, CH$_2$-aryl-NH$_2$, in which n is an integer from 1 to 10; and $R_6$ is hydrogen, alkyl, alkenyl, alkoxyl, aralkyl, alkaryl having from 4 to 24 carbon atoms. In other approaches, the multi-functional viscosity modifiers herein include amine-functionalization provided from the N-arylphenylenediame being selected from N-phenyl-1,4-phenylenediamine; N-phenyl-1,3-phenylendiamine; N-phenyl-1,2-phenylenediamine; and mixtures thereof.

In other approaches, the additives of the present disclosure are functionalized with any numerous polyamines in preparing the functionalized dispersant viscosity modifier or dispersant. For example and in some approaches, non-limiting exemplary polyamines may include aminoguanidine bicarbonate (AGBC), diethylene triamine (DETA), triethylene tetramine (TETA), tetraethylene pentamine (TEPA), pentaethylene hexamine (PEHA) and heavy polyamines. A heavy polyamine may comprise a mixture of polyalkylenepolyamines having small amounts of lower polyamine oligomers such as TEPA and PEHA, but primarily oligomers having seven or more nitrogen atoms, two or more primary amines per molecule, and more extensive branching than conventional polyamine mixtures. Additional non-limiting polyamines which may be used to prepare the hydrocarbyl-substituted succinimide dispersant are disclosed in U.S. Pat. No. 6,548,458, the disclosure of which is incorporated herein by reference in its entirety. In an embodiment of the disclosure, the polyamine may be selected from tetraethylene pentamine (TEPA).

Acylated Olefin Copolymer:

As noted above, the lubricant additive, in one approach, may be an acylated olefin copolymer viscosity modifier. The olefin copolymer, in such approach, may have a copolymer backbone of ethylene and an alkylene with 3 to 18 carbon atoms, for example 3 to 5, 3 to 10, 3 to 15, 5 to 10, 8 to 12, 10 to 15, or 10 to 18 carbon atoms. In some approaches, the alkylene may be propylene, isopropylene, butylene, isobutylene, n-pentylene, isopentylene, and/or neopentylene, and mixtures thereof.

In other approaches, the polymers are copolymers of ethylene and one or more $C_3$ to $C_{18}$ alpha-olefins. Copolymers of ethylene and propylene are most preferred. Other alpha-olefins suitable in place of propylene to form the copolymer or to be used in combination with ethylene and propylene to form a terpolymer include 1-butene, 1-pentene, 1-hexene, 1-octene and styrene; αω-diolefins such as 1,5-hexadiene, 1,6-heptadiene, 1,7-octadiene; branched chain alpha-olefins such as 4-methylbutene-1,5-methylpentene-1 and 6-methylheptene-1; and mixtures thereof.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of this disclosure are 1-isopropylidene-3a,4,7,7a-tetrahydroindene, 1-isopropylidene dicyclopentadiene, dihydro-isodicyclopentadiene, and 2-(2-methylene-4-methyl-3-pentenyl)[2.2.1]bicyclo-5-heptene.

Ethylene-propylene or higher alpha-olefin copolymers may consist of from about 15 to 80 mole percent ethylene and from about 85 to 20 mole percent $C_3$ to $C_{18}$ alpha-olefin with the preferred mole ratios being from about 35 to 75 mole percent ethylene and from about 65 to 25 mole percent of a $C_3$ to $C_{18}$ alpha-olefin, with the more preferred proportions being from 50 to 70 mole percent ethylene and 50 to 30 mole percent $C_3$ to $C_{18}$ alpha-olefin, and the most preferred proportions being from 55 to 65 mole percent ethylene and 45 to 35 mole percent $C_3$ to $C_{18}$ alpha-olefin.

Terpolymer variations of the foregoing polymers may contain from about 0.1 to 10 mole percent of a non-conjugated diene or triene.

The terms polymer and copolymer are used generically to encompass ethylene copolymers, terpolymers or interpolymers. These materials may contain minor amounts of other olefinic monomers so long as the basic characteristics of the ethylene copolymers are not materially changed.

The polymerization reaction used to form the ethylene-olefin copolymer substrate may be generally carried out in the presence of a conventional Ziegler-Natta or metallocene catalyst system. The polymerization medium is not specific and can include solution, slurry, or gas phase processes, as known to those skilled in the art. When solution polymerization is employed, the solvent may be any suitable inert hydrocarbon solvent that is liquid under reaction conditions for polymerization of alpha-olefins; examples of satisfactory hydrocarbon solvents include straight chain paraffins having from 5 to 8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. When slurry polymerization is employed, the liquid phase for polymerization is preferably liquid propylene. It is desirable that the polymerization medium be free of substances that will interfere with the catalyst components.

In one embodiment, the olefin copolymer substrate is an ethylene copolymer or terpolymer such as an oil soluble linear or branched polymer having a number average molecular weight of about 5,000 to about 150,000, for example about 5,000 to about 100,000, about 5,000 to about 50,000, about 20,000 to about 150,000, about 20,000 to about 100,000, about 50,000 to about 150,000, or about 50,000 to about 100,000.

The acyl groups grafted on to the olefin copolymer are obtained from ethylenically unsaturated carboxylic acid or anhydride reactants that include at least one carbon-carbon double bond and further comprise at least one carboxylic acid and/or dicarboxylic anhydride group. In one approach, the reactants forming the acyl groups grafted on to the olefin copolymer are selected acrylic acid, methacrylic acid, cinnamic acid, ferulic acid, ortho coumaric acid, meta coumaric acid, para coumaric acid, crotonic acid, maleic acid, maleic anhydride, fumaric acid, itaconic acid and itaconic anhydride or a combination thereof. In another approach, the reactants forming the acyl groups grafted on to the olefin copolymer are selected from maleic acid, fumaric acid, maleic anhydride, or a combination thereof. In yet a further approach, the reactants forming the acyl groups grafted on to the olefin copolymer include maleic anhydride moieties.

In one embodiment, the olefin copolymer has grafted thereon from about 0.1 to about 0.8 maleic acid groups per 1000 number average molecular weight units of olefin copolymer, for example about 0.2 to about 0.75, about 0.5 to about 0.75, about 0.4 to about 0.5, or about 0.4 to about 0.8, or about 0.1 to about 0.4 acyl groups per 1000 number average molecular weight units of the olefin copolymer. In some further embodiments, the olefin copolymer has grafted thereon about 0.2, about 0.3, about 0.4, about 0.5, about 0.6 or about 0.75 maleic anhydride groups per 1000 number average molecular weight units of olefin copolymer. The examples herein provide further discussion on how the grafting value is calculated.

The carboxylic reactant is grafted onto the prescribed polymer backbone in an amount to provide about 0.1 to about 0.8 carboxylic groups per 1000 number average molecular weight units of the polymer backbone, preferably about 0.3 to about 0.75 carboxylic groups per 1000 number average molecular weight. For example, and in one approach, a copolymer substrate with Mn of 20,000 is grafted with 6 to 15 carboxylic groups per polymer chain or 3 to 7.5 moles of maleic anhydride per mole of polymer. A copolymer with Mn of 100,000 is grafted with 30 to 75 carboxylic groups per polymer chain or 15 to 37.5 moles of maleic anhydride per polymer chain. The minimum level of functionality is the level needed to achieve the minimum satisfactory dispersancy performance. Above the maximum functionality level little, if any, additional dispersancy performance is noted and other properties of the additive may be adversely affected.

The grafting reaction to form the acylated olefin copolymers is generally carried out with the aid of a free-radical initiator either in solution or in bulk, as in an extruder or intensive mixing device. When the polymerization is carried out in hexane solution, it is economically convenient to carry out the grafting reaction in hexane as described in U.S. Pat. Nos. 4,340,689; 4,670,515; and 4,948,842 incorporated herein by reference. The resulting polymer intermediate is characterized by having carboxylic acid acylating functionality randomly within its structure.

In the bulk process for forming the acylated olefin copolymers, the olefin copolymer is fed to rubber or plastic processing equipment such as an extruder, intensive mixer or masticator, heated to a temperature of about 150° to about 400° C. and the ethylenically unsaturated carboxylic acid reagent and free-radical initiator are separately co-fed to the molten polymer to effect grafting. The reaction is carried out optionally with mixing conditions to effect shearing and grafting of the ethylene copolymers according to U.S. Pat. No. 5,075,383, incorporated herein by reference. The processing equipment is generally purged with nitrogen to prevent oxidation of the polymer and to aid in venting unreacted reagents and byproducts of the grafting reaction. The residence time in the processing equipment is sufficient to provide for the desired degree of acylation and to allow for purification of the acylated copolymer via venting. Mineral or synthetic lubricating oil may optionally be added to the processing equipment after the venting stage to dissolve the acylated copolymer.

The free-radical initiators which may be used to graft the ethylenically unsaturated carboxylic acid material to the polymer backbone include peroxides, hydroperoxides, peresters, and also azo compounds and preferably those which have a boiling point greater than about 100° C. and decompose thermally within the grafting temperature range to provide free radicals. Representatives of these free-radical initiators are azobutyronitrile, dicumyl peroxide, 2,5-dimethylhexane-2,5-bis-tertiarybutyl peroxide and 2,5-dimethylhex-3-yne-2,5-bis-tertiary-butyl peroxide. The initiator is used in an amount of between about 0.005% and about 1% by weight based on the weight of the reaction mixture.

Other methods known in the art for effecting reaction of ethylene-olefin copolymers with ethylenically unsaturated carboxylic reagents, such as halogenation reactions, thermal or "ene" reactions or mixtures thereof, can be used instead of the free-radical grafting process. Such reactions are conveniently carried out in mineral oil or bulk by heating the reactants at temperatures of about 250° to about 400° C. under an inert atmosphere to avoid the generation of free radicals and oxidation byproducts. "Ene" reactions are a preferred method of grafting when the ethylene-olefin copolymer contains unsaturation. To achieve the high graft levels, 0.3 to 0.5 carboxylic groups per 1000 Mn, desired by this disclosure, it may be necessary to follow or proceed the "ene" or thermal graft reaction with a free radical graft reaction.

Hydrocarbyl Substituted Dicarboxylic Anhydride Derivative:

In other approaches, the lubricant additive herein may be a dispersant such as a hydrocarbyl substituted dicarboxylic anhydride derivative of Formula V

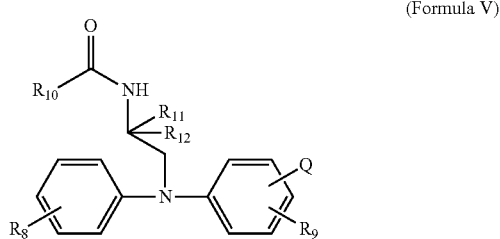

(Formula V)

wherein $R_8$ is hydrogen, —NH-aryl, —NH-arylalkyl, —NH-alkyl, or a branched or straight chain radical having from 4 to 24 carbon atoms that can be alkyl, alkenyl, alkoxyl aralkyl, alkaryl, hydroxyalkyl or aminoalkyl; $R_9$ is hydrogen, alkyl, alkenyl, alkoxyl, aralkyl, alkaryl having from 4 to 24 carbon atoms. $R_{10}$ is hydrogen, phenyl, an alkoxy substituted phenyl, or a C1 to C18 alkyl or alkoxy group; $R_{11}$ and $R_{12}$ are independently hydrogen or a C1 to C18 hydrocarbyl group; and Q is a succinamide or succinimide derived structure from a hydrocarbyl substituted dicarboxylic anhydride derivative selected from a diamide, acid/amide, acid/ester, diacid, amide/ester, diester, and imide wherein the hydrocarbyl substituent of component Q has a number average molecular weight of about 750 to about 5,000.

In some approaches of this aspect, the hydrocarbyl substituent of the dicarboxylic anhydride derivative of component Q is a linear or branched aliphatic group having a number average molecular weight of about 750 to about 2500 and including C2 to C10 monomer units. The hydrocarbyl substituent may be derived from butene polymers, for example polymers of isobutylene. Suitable polyisobutenes for use herein include those formed from polyisobutylene or highly reactive polyisobutylene having at least about 60%, such as about 70% to about 90% and above, terminal vinylidene content. Suitable polyisobutenes may include those prepared using BF3 catalysts. The average number molecular weight of the polyalkenyl substituent may vary over a wide range, for example from about 100 to about 5000, such as from about 500 to about 5000, as determined by GPC using polystyrene as a calibration reference as described above.

The diester, succinamide or imide portion of Q may be selected from maleic anhydride or from carboxylic reactants other than maleic anhydride, such as maleic acid, fumaric acid, malic acid, tartaric acid, itaconic acid, itaconic anhydride, citraconic acid, citraconic anhydride, mesaconic acid, ethylmaleic anhydride, dimethylmaleic anhydride, ethylmaleic acid, dimethylmaleic acid, hexylmaleic acid, and the like, including the corresponding acid halides and lower aliphatic esters. A suitable dicarboxylic anhydride is maleic anhydride. A mole ratio of maleic anhydride to hydrocarbyl moiety in a reaction mixture used to make the Q group above may vary widely. Accordingly, the mole ratio may vary from about 5:1 to about 1:5, for example from about 3:1 to about 1:3, and as a further example, the maleic anhydride may be used in stoichiometric excess to force the reaction to completion. The unreacted maleic anhydride may be removed by vacuum distillation.

DEFINITIONS

As used herein, the term "effective concentration" refers to the concentration of the viscosity modifier necessary for a sooted base oil to show Newtonian behavior, which indicates that the soot particles in the base oil are sufficiently dispersed.

As used herein, the term "olefin copolymer" refers to a random and/or block polymer comprised of two or more different types of monomers, wherein all monomers contain at least one olefin (carbon-carbon double bond).

For purposes of this disclosure, the chemical elements are identified in accordance with the Periodic Table of the Elements, CAS version, Handbook of Chemistry and Physics, 75th Ed. Additionally, general principles of organic chemistry are described in "Organic Chemistry", Thomas Sorrell, University Science Books, Sausolito: 1999, and "March's Advanced Organic Chemistry", 5th Ed., Ed.: Smith, M. B. and March, J., John Wiley & Sons, New York: 2001, the entire contents of which are hereby incorporated by reference.

As described herein, compounds may optionally be substituted with one or more substituents, such as are illustrated generally above, or as exemplified by particular classes, subclasses, and species of the disclosure.

As used herein, the term "hydrocarbyl or hydrocarbyl group" is a group with a carbon atom directly attached to a remainder of the molecule and each hydrocarbyl group is independently selected from hydrocarbon substituents, and substituted hydrocarbon substituents containing one or more of halo groups, hydroxyl groups, alkoxy groups, mercapto groups, nitro groups, nitroso groups, amino groups, sulfoxy groups, pyridyl groups, furyl groups, thienyl groups, imidazolyl groups, sulfur, oxygen and nitrogen, and wherein no more than two non-hydrocarbon substituents are present for every ten carbon atoms in the hydrocarbyl group.

As used herein the term "aliphatic" encompasses the terms alkyl, alkenyl, alkynyl, each of which being optionally substituted as set forth below.

As used herein, an "alkyl" group refers to a saturated aliphatic hydrocarbon group containing 1-12 (e.g., 1-8, 1-6, or 1-4) carbon atoms. An alkyl group can be straight or branched. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group can be substituted (i.e., optionally substituted) with one or more substituents such as halo, phospho, cycloaliphatic [e.g., cycloalkyl or cycloalkenyl], heterocycloaliphatic [e.g., heterocycloalkyl or heterocycloalkenyl], aryl, heteroaryl, alkoxy, aroyl, heteroaroyl, acyl [e.g., (aliphatic) carbonyl, (cycloaliphatic)carbonyl, or (heterocycloaliphatic) carbonyl], nitro, cyano, amido [e.g., (cycloalkylalkyl)carbonylamino, arylcarbonylamino, aralkylcarbonylamino, (heterocycloalkyl)carbonylamino, (heterocycloalkylalkyl) carbonylamino, heteroarylcarbonylamino, heteroaralkylcarbonylamino alkylaminocarbonyl, cycloalkylaminocarbonyl, heterocycloalkylaminocarbonyl, arylaminocarbonyl, or heteroarylaminocarbonyl], amino [e.g., aliphaticamino, cycloaliphaticamino, or heterocycloaliphaticamino], sulfonyl [e.g., aliphatic-$SO_2$—], sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroarylalkoxy, alkoxycarbonyl, alkylcarbonyloxy, or hydroxy. Without limitation, some examples of substituted alkyls include carboxyalkyl (such as HOOC-alkyl, alkoxycarbonylalkyl, and alkylcarbonyloxyalkyl), cyanoalkyl, hydroxyalkyl, alkoxyalkyl, acylalkyl, aralkyl, (alkoxyaryl)alkyl, (sulfonylamino)alkyl (such as (alkyl-$SO_2$-amino)alkyl), aminoalkyl, amidoalkyl, (cycloaliphatic)alkyl, or haloalkyl.

As used herein, an "alkenyl" group refers to an aliphatic carbon group that contains 2-8 (e.g., 2-12, 2-6, or 2-4) carbon atoms and at least one double bond. Like an alkyl group, an alkenyl group can be straight or branched. Examples of an alkenyl group include, but are not limited to allyl, isoprenyl, 2-butenyl, and 2-hexenyl. An alkenyl group can be optionally substituted with one or more substituents such as halo, phospho, cycloaliphatic [e.g., cycloalkyl or cycloalkenyl], heterocycloaliphatic [e.g., heterocycloalkyl or hetero cycloalkenyl], aryl, heteroaryl, alkoxy, aroyl, heteroaroyl, acyl [e.g., (aliphatic) carbonyl, (cycloaliphatic) carbonyl, or (heterocycloaliphatic)carbonyl], nitro, cyano, amido [e.g., (cycloalkylalkyl)carbonylamino, arylcarbonylamino, aralkylcarbonylamino, (hetero cycloalkyl) carbonylamino, (heterocycloalkylalkyl)carbonylamino, heteroarylcarbonylamino, heteroaralkylcarbonylamino alkylaminocarbonyl, cycloalkylaminocarbonyl, hetero cyclo alkylaminocarbonyl, aryl aminocarbonyl, or heteroarylaminocarbonyl], amino [e.g., aliphaticamino, cycloaliphaticamino, heterocycloaliphaticamino, or aliphaticsulfonylamino], sulfonyl [e.g., alkyl-$SO_2$—, cycloaliphatic-$SO_2$—, or aryl-$SO_2$—], sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroaralkoxy, alkoxycarbonyl, alkylcarbonyloxy, or hydroxy. Without limitation, some examples of substituted alkenyls include cyanoalkenyl, alkoxyalkenyl, acylalkenyl, hydroxyalkenyl, aralkenyl, (alkoxyaryl) alkenyl, (sulfonylamino)alkenyl (such as (alkyl-$SO_2$-amino)alkenyl), aminoalkenyl, amidoalkenyl, (cycloaliphatic)alkenyl, or haloalkenyl.

As used herein, an "alkynyl" group refers to an aliphatic carbon group that contains 2-8 (e.g., 2-12, 2-6, or 2-4) carbon atoms and has at least one triple bond. An alkynyl group can be straight or branched. Examples of an alkynyl group include, but are not limited to, propargyl and butynyl. An alkynyl group can be optionally substituted with one or more substituents such as aroyl, heteroaroyl, alkoxy, cycloalkyloxy, heterocycloalkyloxy, aryloxy, heteroaryloxy, aralkyloxy, nitro, carboxy, cyano, halo, hydroxy, sulfo, mercapto, sulfanyl [e.g., aliphaticsulfanyl or cycloaliphaticsulfanyl], sulfinyl [e.g., aliphaticsulfinyl or cycloaliphaticsulfinyl], sulfonyl [e.g., aliphatic-$SO_2$—, aliphaticamino-$SO_2$—, or cycloaliphatic-$SO_2$—], amido [e.g., aminocarbonyl, alkylaminocarbonyl, alkylcarbonylamino, cyclo alkylaminocarbonyl, heterocycloalkylaminocarbonyl, cycloalkylcarbonylamino, arylamino carbonyl, arylcarbonylamino, aralkylcarbonylamino, (heterocycloalkyl) carbonylamino, (cycloalkylalkyl)carbonylamino, heteroaralkylcarbonylamino, heteroaryl carbonylamino or heteroarylaminocarbonyl], urea, thiourea, sulfamoyl, sulfamide, alkoxycarbonyl, alkyl carbonyloxy, cycloaliphatic, heterocycloaliphatic, aryl, heteroaryl, acyl [e.g., (cycloaliphatic) carbonyl or (heterocycloaliphatic)carbonyl], amino [e.g., aliphaticamino], sulfoxy, oxo, carboxy, carbamoyl, (cycloaliphatic)oxy, (heterocyclo aliphatic) oxy, or (heteroaryl)alkoxy.

As used herein, an "amino" group refers to —$NR^X R^Y$ wherein each of $R^X$ and $R^Y$ is independently hydrogen, alkyl, cycloakyl, (cycloalkyl)alkyl, aryl, aralkyl, heterocycloalkyl, (heterocycloalkyl)alkyl, heteroaryl, carboxy, sulfanyl, sulfinyl, sulfonyl, (alkyl)carbonyl, (cycloalkyl)carbonyl, ((cycloalkyl)alkyl)carbonyl, arylcarbonyl, (aralkyl)carbonyl, (heterocycloalkyl)carbonyl, ((heterocycloalkyl)alkyl)carbonyl, (heteroaryl)carbonyl, or (heteroaralkyl)carbonyl, each of which being defined herein and being optionally substituted. Examples of amino groups include alkylamino, dialkylamino, or arylamino. When the term "amino" is not the terminal group (e.g., alkylcarbonylamino), it is represented by —$NR^X$—. $R^X$ has the same meaning as defined above.

As used herein, a "cycloalkyl" group refers to a saturated carbocyclic mono- or bicyclic (fused or bridged) ring of 3-10 (e.g., 5-10) carbon atoms. Examples of cycloalkyl groups include cyclopropyl, cyclobutyl, cyclopentyl, cyclohexyl, cycloheptyl, adamantyl, norbornyl, cubyl, octahydroindenyl, decahydro-naphthyl, bicyclo[3.2.1]octyl, bicyclo [2.2.2]octyl, bicyclo[3.3.1]nonyl, bicyclo[3.3.2]decyl, bicyclo[2.2.2]octyl, adamantyl, or ((aminocarbonyl)cycloalkyl)cycloalkyl.

As used herein, a "heterocycloalkyl" group refers to a 3-10 membered mono- or bicylic (fused or bridged) (e.g., 5- to 10-membered mono- or bicyclic) saturated ring structure, in which one or more of the ring atoms is a heteroatom (e.g., N, O, S, or combinations thereof). Examples of a heterocycloalkyl group include piperidyl, piperazyl, tetrahydropyranyl, tetrahydrofuryl, 1,4-dioxolanyl, 1,4-dithianyl, 1,3-dioxolanyl, oxazolidyl, isoxazolidyl, morpholinyl, thiomorpholyl, octahydrobenzofuryl, octahydrochromenyl, octahydrothiochromenyl, octahydroindolyl, octahydropyrindinyl, decahydroquinolinyl, octahydrobenzo[b]thiopheneyl, 2-oxa-bicyclo[2.2.2]octyl, 1-aza-bicyclo[2.2.2]octyl, 3-aza-bicyclo[3.2.1]octyl, and 2,6-dioxa-tricyclo [3.3.1.0]nonyl. A monocyclic heterocycloalkyl group can be fused with a phenyl moiety to form structures, such as tetrahydroisoquinoline, which would be categorized as heteroaryls.

A "heteroaryl" group, as used herein, refers to a monocyclic, bicyclic, or tricyclic ring system having 4 to 15 ring atoms wherein one or more of the ring atoms is a heteroatom (e.g., N, O, S, or combinations thereof) and in which the monocyclic ring system is aromatic or at least one of the rings in the bicyclic or tricyclic ring systems is aromatic. A heteroaryl group includes a benzofused ring system having 2 to 3 rings. For example, a benzofused group includes benzo fused with one or two 4 to 8 membered heterocycloaliphatic moieties (e.g., indolizyl, indolyl, isoindolyl, 3H-indolyl, indolinyl, benzo[b]furyl, benzo[b]thiophenyl, quinolinyl, or isoquinolinyl). Some examples of heteroaryl are pyridyl, 1H-indazolyl, furyl, pyrrolyl, thienyl, thiazolyl, oxazolyl, imidazolyl, tetrazolyl, benzofuryl, isoquinolinyl, benzthiazolyl, xanthene, thioxanthene, phenothiazine, dihydroindole, benzo[1,3]dioxole, benzo[b]furyl, benzo[b]thiophenyl, indazolyl, benzimidazolyl, benzthiazolyl, puryl, cinnolyl, quinolyl, quinazolyl,cinnolyl, phthalazyl, quinazolyl, quinoxalyl, isoquinolyl, 4H-quinolizyl, benzo-1,2,5-thiadiazolyl, or 1,8-naphthyridyl.

Without limitation, monocyclic heteroaryls include furyl, thiophenyl, 2H-pyrrolyl, pyrrolyl, oxazolyl, thazolyl, imidazolyl, pyrazolyl, isoxazolyl, isothiazolyl, 1,3,4-thiadiazolyl, 2H-pyranyl, 4-H-pranyl, pyridyl, pyridazyl, pyrimidyl, pyrazolyl, pyrazyl, or 1,3,5-triazyl. Monocyclic heteroaryls are numbered according to standard chemical nomenclature.

Without limitation, bicyclic heteroaryls include indolizyl, indolyl, isoindolyl, 3H-indolyl, indolinyl, benzo[b]furyl, benzo[b]thiophenyl, quinolinyl, isoquinolinyl, indolizinyl, isoindolyl, indolyl, benzo[b]furyl, bexo[b]thiophenyl, indazolyl, benzimidazyl, benzthiazolyl, purinyl, 4H-quinolizyl, quinolyl, isoquinolyl, cinnolyl, phthalazyl, quinazolyl, quinoxalyl, 1,8-naphthyridyl, or pteridyl. Bicyclic heteroaryls are numbered according to standard chemical nomenclature.

The novel lubricant additives, such as the novel dispersant viscosity index modifiers or lubricant dispersants described herein can be used as part of a lubricating oil composition. Accordingly, said lubricating oil compositions further comprise a base oil as described below. In some approaches, a lubricating oil may include about 0.1 to about 5 weight percent of the polymer on a solids basis.

Base Oil

The dispersant viscosity index modifiers and/or dispersants of the present disclosure may be blended with a majority of base oil. Base oils suitable for use in formulating engine lubricant compositions and/or the metal working compositions (or other lubricating composition) may be selected from any of suitable synthetic oils, animal oils, vegetable oils, mineral oils or mixtures thereof. Animal oils and vegetable oils (e.g., lard oil, castor oil) as well as mineral lubricating oils such as liquid petroleum oils and solvent treated or acid-treated mineral lubricating oils of the paraffinic, naphthenic or mixed paraffinic-naphthenic types may be used. Oils derived from coal or shale may also be suitable. The base oil typically may have a viscosity of about 2 to about 15 cSt or, as a further example, about 2 to about 10 cSt at 100° C. Further, an oil derived from a gas-to-liquid process is also suitable.

Suitable synthetic base oils may include alkyl esters of dicarboxylic acids, polyglycols and alcohols, poly-alpha-olefins, including polybutenes, alkyl benzenes, organic esters of phosphoric acids, and polysilicone oils. Synthetic oils include hydrocarbon oils such as polymerized and interpolymerized olefins (e.g., polybutylenes, polypropylenes, propylene isobutylene copolymers, etc.); poly(1-hexenes), poly-(1-octenes), poly(1-decenes), etc. and mixtures thereof; alkylbenzenes (e.g., dodecylbenzenes, tetradecylbenzenes, di-nonylbenzenes, di-(2-ethylhexyl)benzenes, etc.); polyphenyls (e.g., biphenyls, terphenyl, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic oils that may be used. Such oils are exemplified by the oils prepared through polymerization of ethylene oxide or propylene oxide, the alkyl and aryl ethers of these polyoxyalkylene polymers (e.g., methyl-polyisopropylene glycol ether having an average molecular weight of about 1000, diphenyl ether of polyethylene glycol having a molecular weight of about 500-1000, diethyl ether of polypropylene glycol having a molecular weight of about 1000-1500, etc.) or mono- and polycarboxylic esters thereof, for example, the acetic acid esters, mixed $C_3$-$C_8$ fatty acid esters, or the $C_{13}$ oxo-acid diester of tetraethylene glycol.

Another class of synthetic oils that may be used includes the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Hence, the base oil used which may be used to make the engine and/or metalworking lubricant compositions as described herein may be selected from any of the base oils in Groups I-V as specified in the American Petroleum Institute (API) Base Oil Interchangeability Guidelines. Such base oil groups are as follows:

TABLE 1

| Base Oil Group[1] | Sulfur (wt %) | | Saturates (wt. %) | Viscosity Index |
|---|---|---|---|---|
| Group I | >0.03 | And/or | <90 | 80 to 120 |
| Group II | ≤0.03 | And | ≥90 | 80 to 120 |
| Group III | ≤0.03 | And | ≥90 | ≥120 |
| Group IV | | all polyalphaolefins (PAOs) | | |
| Group V | | all others not included in Groups I-IV | | |

[1]Groups I-III are mineral oil base stocks.

The base oil may contain a minor or major amount of a poly-alpha-olefin (PAO). Typically, the poly-alpha-olefins are derived from monomers having from about 4 to about 30, or from about 4 to about 20, or from about 6 to about 16 carbon atoms. Examples of useful PAOs include those derived from octene, decene, mixtures thereof, and the like. PAOs may have a viscosity of from about 2 to about 15, or from about 3 to about 12, or from about 4 to about 8 cSt at 100° C. Examples of PAOs include 4 cSt at 100° C. poly-alpha-olefins, 6 cSt at 100° C. poly-alpha-olefins, and mixtures thereof. Mixtures of mineral oil with the foregoing poly-alpha-olefins may be used.

The base oil may be an oil derived from Fischer-Tropsch synthesized hydrocarbons. Fischer-Tropsch synthesized hydrocarbons are made from synthesis gas containing $H_2$ and CO using a Fischer-Tropsch catalyst. Such hydrocarbons typically require further processing in order to be useful as the base oil. For example, the hydrocarbons may be hydroisomerized using processes disclosed in U.S. Pat. No. 6,103,099 or 6,180,575; hydrocracked and hydroisomerized using processes disclosed in U.S. Pat. No. 4,943,672 or 6,096,940; dewaxed using processes disclosed in U.S. Pat. No. 5,882,505; or hydroisomerized and dewaxed using processes disclosed in U.S. Pat. Nos. 6,013,171; 6,080,301; or 6,165,949.

Unrefined, refined, and rerefined oils, either natural or synthetic (as well as mixtures of two or more of any of these) of the type disclosed hereinabove can be used in the base oils. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives, contaminants, and oil breakdown products.

The base oil may be combined with the emulsifying agent described herein along with optional additives to provide an engine lubricant composition. Accordingly, the base oil may be present in the engine lubricant composition in a major amount ranging from about 50 wt. % to about 95 wt. % based on a total weight of the lubricant composition.

Other optional additives of the lubricating oils are described below.

Metal-Containing Detergents

Metal detergents that may be used with the dispersant reaction product described above generally comprise a polar head with a long hydrophobic tail where the polar head comprises a metal salt of an acidic organic compound. The salts may contain a substantially stoichiometric amount of the metal, in which case they are usually described as normal or neutral salts, and would typically have a total base number or TBN (as measured by ASTM D2896) of from about 0 to less than about 150. Large amounts of a metal base may be included by reacting an excess of a metal compound such as an oxide or hydroxide with an acidic gas such as carbon dioxide. The resulting overbased detergent comprises micelles of neutralized detergent surrounding a core of inorganic metal base (e.g., hydrated carbonates). Such overbased detergents may have a TBN of about 150 or greater, such as from about 150 to about 450 or more.

Detergents that may be suitable for use in the present embodiments include oil-soluble overbased, low base, and neutral sulfonates, phenates, sulfurized phenates, and salicylates of a metal, particularly the alkali or alkaline earth metals, e.g., sodium, potassium, lithium, calcium, and magnesium. More than one metal may be present, for example, both calcium and magnesium. Mixtures of calcium and/or magnesium with sodium may also be suitable. Suitable metal detergents may be overbased calcium or magnesium sulfonates having a TBN of from 150 to 450 TBN, overbased calcium or magnesium phenates or sulfurized phenates having a TBN of from 150 to 300 TBN, and overbased calcium or magnesium salicylates having a TBN of from 130 to 350. Mixtures of such salts may also be used.

The metal-containing detergent may be present in a lubricating composition in an amount of from about 0.5 wt % to about 5 wt %. As a further example, the metal-containing detergent may be present in an amount of from about 1.0 wt % to about 3.0 wt %. The metal-containing detergent may be present in a lubricating composition in an amount sufficient to provide from about 500 to about 5000 ppm alkali and/or alkaline earth metal to the lubricant composition based on a total weight of the lubricant composition. As a further example, the metal-containing detergent may be present in a lubricating composition in an amount sufficient to provide from about 1000 to about 3000 ppm alkali and/or alkaline earth metal.

Phosphorus-Based Anti-Wear Agents

Phosphorus-based wear preventative agents may be used and may comprise a metal dihydrocarbyl dithiophosphate compound, such as but not limited to a zinc dihydrocarbyl dithiophosphate compound. Suitable metal dihydrocarbyl dithiophosphates may comprise dihydrocarbyl dithiophosphate metal salts wherein the metal may be an alkali or alkaline earth metal, or aluminum, lead, tin, molybdenum, manganese, nickel, copper, or zinc.

Dihydrocarbyl dithiophosphate metal salts may be prepared in accordance with known techniques by first forming a dihydrocarbyl dithiophosphoric acid (DDPA), usually by reaction of one or more alcohol or a phenol with P255 and then neutralizing the formed DDPA with a metal compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the metal salt, any basic or neutral metal compound could be used but the oxides, hydroxides and carbonates are most generally employed. Commercial additives frequently contain an excess of metal due to the use of an excess of the basic metal compound in the neutralization reaction.

The zinc dihydrocarbyl dithiophosphates (ZDDP) are oil soluble salts of dihydrocarbyl dithiophosphoric acids and may be represented by the following formula:

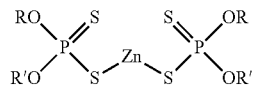

wherein R and R' may be the same or different hydrocarbyl radicals containing from 1 to 18, for example 2 to 12, carbon atoms and including radicals such as alkyl, alkenyl, aryl, arylalkyl, alkaryl, and cycloaliphatic radicals. R and R' groups may be alkyl groups of 2 to 8 carbon atoms. Thus, the radicals may, for example, be ethyl, n-propyl, i-propyl, n-butyl, butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl. In order to obtain oil solubility, the total number of carbon atoms (i.e., R and R') in the dithiophosphoric acid will generally be about 5 or greater. The zinc dihydrocarbyl dithiophosphate can therefore comprise zinc dialkyl dithiophosphates.

Other suitable components that may be utilized as the phosphorus-based wear preventative include any suitable organophosphorus compound, such as but not limited to, phosphates, thiophosphates, di-thiophosphates, phosphites, and salts thereof and phosphonates. Suitable examples are tricresyl phosphate (TCP), di-alkyl phosphite (e.g., dibutyl hydrogen phosphite), and amyl acid phosphate.

Another suitable component is a phosphorylated succinimide such as a completed reaction product from a reaction between a hydrocarbyl substituted succinic acylating agent and a polyamine combined with a phosphorus source, such as inorganic or organic phosphorus acid or ester. Further, it may comprise compounds wherein the product may have amide, amidine, and/or salt linkages in addition to the imide linkage of the type that results from the reaction of a primary amino group and an anhydride moiety.

The phosphorus-based wear preventative may be present in a lubricating composition in an amount sufficient to provide from about 200 to about 2000 ppm phosphorus. As a further example, the phosphorus-based wear preventative may be present in a lubricating composition in an amount sufficient to provide from about 500 to about 800 ppm phosphorus.

The phosphorus-based wear preventative may be present in a lubricating composition in an amount sufficient to provide a ratio of alkali and/or alkaline earth metal content (ppm) based on the total amount of alkali and/or alkaline earth metal in the lubricating composition to phosphorus content (ppm) based on the total amount of phosphorus in the lubricating composition of from about 1.6 to about 3.0 (ppm/ppm).

Friction Modifiers

Embodiments of the present disclosure may include one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanadine, alkanolamides, phosphonates, metal-containing compounds, glycerol esters, and the like.

Suitable friction modifiers may contain hydrocarbyl groups that are selected from straight chain, branched chain, or aromatic hydrocarbyl groups or admixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms and may be saturated or unsaturated.

Aminic friction modifiers may include amides of polyamines. Such compounds can have hydrocarbyl groups that are linear, either saturated or unsaturated, or a mixture thereof and may contain from about 12 to about 25 carbon atoms.

Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291, herein incorporated by reference.

Other suitable friction modifiers may include an organic, ashless (metal-free), nitrogen-free organic friction modifier. Such friction modifiers may include esters formed by reacting carboxylic acids and anhydrides with alkanols. Other useful friction modifiers generally include a polar terminal group (e.g. carboxyl or hydroxyl) covalently bonded to an oleophilic hydrocarbon chain. Esters of carboxylic acids and anhydrides with alkanols are described in U.S. Pat. No. 4,702,850. Another example of an organic ashless nitrogen-free friction modifier is known generally as glycerol monooleate (GMO) which may contain mono- and diesters of oleic acid. Other suitable friction modifiers are described in U.S. Pat. No. 6,723,685, herein incorporated by reference. The ashless friction modifier may be present in the lubricant composition in an amount ranging from about 0.1 to about 0.4 percent by weight based on a total weight of the lubricant composition.

Suitable friction modifiers may also include one or more molybdenum compounds. The molybdenum compound may be selected from the group consisting of molybdenum dithiocarbamates (MoDTC), molybdenum dithiophosphates, molybdenum dithiophosphinates, molybdenum xanthates, molybdenum thioxanthates, molybdenum sulfides, a trinuclear organo-molybdenum compound, molybdenum/amine complexes, and mixtures thereof.

Additionally, the molybdenum compound may be an acidic molybdenum compound. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897.

Suitable molybdenum dithiocarbamates may be represented by the formula:

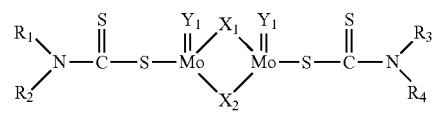

where $R_1$, $R_2$, $R_3$, and $R_4$ each independently represent a hydrogen atom, a $C_1$ to $C_{20}$ alkyl group, a $C_6$ to $C_{20}$ cycloalkyl, aryl, alkylaryl, or aralkyl group, or a $C_3$ to $C_{20}$ hydrocarbyl group containing an ester, ether, alcohol, or carboxyl group; and $X_1$, $X_2$, $Y_1$, and $Y_2$ each independently represent a sulfur or oxygen atom.

Examples of suitable groups for each of $R_1$, $R_2$, $R_3$, and $R_4$ include 2-ethylhexyl, nonylphenyl, methyl, ethyl, n-propyl, iso-propyl, n-butyl, t-butyl, n-hexyl, n-octyl, nonyl, decyl, dodecyl, tridecyl, lauryl, oleyl, linoleyl, cyclohexyl and phenylmethyl. $R_1$ to $R_4$ may each have $C_6$ to $C_{18}$ alkyl groups. $X_1$ and $X_2$ may be the same, and $Y_1$ and $Y_2$ may be the same. $X_1$ and $X_2$ may both comprise sulfur atoms, and $Y_1$ and $Y_2$ may both comprise oxygen atoms.

Further examples of molybdenum dithiocarbamates include $C_6$-$C_{18}$ dialkyl or diaryldithiocarbamates, or alkyl-aryldithiocarbamates such as dibutyl-, diamyl-di-(2-ethylhexyl)-, dilauryl-, dioleyl-, and dicyclohexyl-dithiocarbamate.

Another class of suitable organo-molybdenum compounds are trinuclear molybdenum compounds, such as those of the formula $Mo_3S_kL_nQ_z$ and mixtures thereof, wherein L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685, herein incorporated by reference.

The molybdenum compound may be present in a fully formulated engine lubricant in an amount to provide about 5 ppm to 500 ppm by weight molybdenum. As a further example, the molybdenum compound may be present in an amount to provide about 50 to 300 ppm by weight molybdenum. A particularly suitable amount of molybdenum compound may be an amount sufficient to provide from about 60 to about 250 ppm by weight molybdenum to the lubricant composition.

Anti-Foam Agents

In some embodiments, a foam inhibitor may form another component suitable for use in the compositions. Foam inhibitors may be selected from silicones, polyacrylates, and the like. The amount of antifoam agent in the engine lubricant formulations described herein may range from about 0.001 wt % to about 0.1 wt % based on the total weight of the formulation. As a further example, antifoam agent may be present in an amount from about 0.004 wt. % to about 0.008 wt. %.

Oxidation Inhibitor Components

Oxidation inhibitors or antioxidants reduce the tendency of base stocks to deteriorate in service which deterioration can be evidenced by the products of oxidation such as sludge and varnish-like deposits that deposit on metal surfaces and by viscosity growth of the finished lubricant. Such oxidation inhibitors include hindered phenols, sulfurized hindered phenols, alkaline earth metal salts of alkylphenolthioesters having $C_5$ to $C_{12}$ alkyl side chains, sulfurized alkylphenols, metal salts of either sulfurized or nonsulfurized alkylphenols, for example calcium nonylphenol sulfide, ashless oil soluble phenates and sulfurized phenates, phosphosulfurized or sulfurized hydrocarbons, phosphorus esters, metal thiocarbamates, and oil soluble copper compounds as described in U.S. Pat. No. 4,867,890.

Other antioxidants that may be used include sterically hindered phenols and esters thereof, diarylamines, alkylated phenothiazines, sulfurized compounds, and ashless dialkyldithiocarbamates. Non-limiting examples of sterically hindered phenols include, but are not limited to, 2,6-di-tertiary butylphenol, 2,6 di-tertiary butyl methylphenol, 4-ethyl-2,6-di-tertiary butylphenol, 4-propyl-2,6-di-tertiary butylphenol, 4-butyl-2,6-di-tertiary butylphenol, 4-pentyl-2,6-di-tertiary butylphenol, 4-hexyl-2,6-di-tertiary butylphenol, 4-heptyl-2,6-di-tertiary butylphenol, 4-(2-ethylhexyl)-2,6-di-tertiary butylphenol, 4-octyl-2,6-di-tertiary butylphenol, 4-nonyl-2,6-di-tertiary butylphenol, 4-decyl-2,6-di-tertiary butylphenol, 4-undecyl-2,6-di-tertiary butylphenol, 4-dodecyl-2,6-di-tertiary butylphenol, methylene bridged sterically hindered phenols including but not limited to 4,4-methylenebis(6-tert-butyl-o-cresol), 4,4-methylenebis(2-tert-amyl-o-cresol), 2,2-methylenebi s(4-methyl-6 tert-butylphenol, 4,4-methylene-bis(2,6-di-tert-butylphenol) and mixtures thereof as described in U.S Publication No. 2004/0266630.

Diarylamine antioxidants include, but are not limited to diarylamines having the formula:

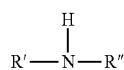

wherein R' and R" each independently represents a substituted or unsubstituted aryl group having from 6 to 30 carbon atoms. Illustrative of substituents for the aryl group include aliphatic hydrocarbon groups such as alkyl having from 1 to 30 carbon atoms, hydroxy groups, halogen radicals, carboxylic acid or ester groups, or nitro groups.

The aryl group is preferably substituted or unsubstituted phenyl or naphthyl, particularly wherein one or both of the aryl groups are substituted with at least one alkyl having from 4 to 30 carbon atoms, preferably from 4 to 18 carbon atoms, most preferably from 4 to 9 carbon atoms. It is preferred that one or both aryl groups be substituted, e.g. mono-alkylated diphenylamine, di-alkylated diphenylamine, or mixtures of mono- and di-alkylated diphenylamines.

The diarylamines may be of a structure containing more than one nitrogen atom in the molecule. Thus the diarylamine may contain at least two nitrogen atoms wherein at least one nitrogen atom has two aryl groups attached thereto, e.g. as in the case of various diamines having a secondary nitrogen atom as well as two aryls on one of the nitrogen atoms.

Examples of diarylamines that may be used include, but are not limited to: diphenylamine; various alkylated diphenylamines; 3-hydroxydiphenylamine; N-phenyl-1,2-phenylenediamine; N-phenyl-1,4-phenylenediamine; monobutyldiphenyl-amine; dibutyldiphenylamine; monooctyldiphenylamine; dioctyldiphenylamine; mononyldiphenylamine; dinonyldiphenylamine; monotetradecyldiphenylamine; ditetradecyldiphenylamine, phenyl-alpha-naphthylamine; monooctyl phenyl-alpha-naphthylamine; phenyl-beta-naphthylamine; monoheptyldiphenylamine; diheptyl-diphenylamine; p-oriented styrenated diphenylamine; mixed butyloctyldi-phenylamine; and mixed octylstyryldiphenylamine.

The sulfur containing antioxidants include, but are not limited to, sulfurized olefins that are characterized by the type of olefin used in their production and the final sulfur content of the antioxidant. High molecular weight olefins, i.e. those olefins having an average molecular weight of 168 to 351 g/mole, are preferred. Examples of olefins that may be used include alpha-olefins, isomerized alpha-olefins, branched olefins, cyclic olefins, and combinations of these.

Alpha-olefins include, but are not limited to, any $C_4$ to $C_{25}$ alpha-olefins. Alpha-olefins may be isomerized before the sulfurization reaction or during the sulfurization reaction. Structural and/or conformational isomers of the alpha olefin that contain internal double bonds and/or branching may also be used. For example, isobutylene is a branched olefin counterpart of the alpha-olefin 1-butene.

Sulfur sources that may be used in the sulfurization reaction of olefins include: elemental sulfur, sulfur monochloride, sulfur dichloride, sodium sulfide, sodium polysulfide, and mixtures of these added together or at different stages of the sulfurization process.

Unsaturated oils, because of their unsaturation, may also be sulfurized and used as an antioxidant. Examples of oils or fats that may be used include corn oil, canola oil, cottonseed oil, grapeseed oil, olive oil, palm oil, peanut oil, coconut oil, rapeseed oil, safflower seed oil, sesame seed oil, soybean oil, sunflower seed oil, tallow, and combinations of these.

The amount of sulfurized olefin or sulfurized fatty oil delivered to the finished lubricant is based on the sulfur content of the sulfurized olefin or fatty oil and the desired level of sulfur to be delivered to the finished lubricant. For example, a sulfurized fatty oil or olefin containing 20 wt. % sulfur, when added to the finished lubricant at a 1.0 wt. % treat level, will deliver 2000 ppm of sulfur to the finished lubricant. A sulfurized fatty oil or olefin containing 10 wt. % sulfur, when added to the finished lubricant at a 1.0 wt. % treat level, will deliver 1000 ppm sulfur to the finished lubricant. It is desirable that the sulfurized olefin or sulfurized fatty oil to deliver between 200 ppm and 2000 ppm sulfur to the finished lubricant.

A suitable engine lubricant may include additive components in the ranges listed in Table 2 with broad and narrower ranges. Base oil makes up the balance of the lubricant.

TABLE 2

| Component | Wt. % | Wt. % |
|---|---|---|
| Novel dispersant viscosity index modifier and/or dispersant* | 0.1 to 5 | 0.3 to 2 |
| Additional Dispersants | 0-10 | 1-6 |
| Antioxidants | 0-5 | 0.01-3 |
| Metal Detergents | 0-15 | 0.1-8 |
| Corrosion Inhibitor | 0-5 | 0-2 |
| Metal dihydrocarbyl dithiophosphate | 0-6 | 0.1-4 |
| Ash-free amine phosphate salt | 0-6 | 0.0-4 |
| Antifoaming agents | 0-5 | 0.001-0.15 |
| Antiwear agents | 0-1 | 0-0.8 |
| Pour point depressant | 0-5 | 0.01-1.5 |
| Viscosity modifier | 0-20 | 0.25-10 |
| Friction modifiers | 0-2 | 0.1-1 |

*based on a solid polymer basis

Additional optional additives that may be included in lubricant compositions described herein include, but are not limited to, rust inhibitors, emulsifiers, demulsifiers, and oil-soluble titanium-containing additives.

Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent). The use of an additive concentrate may take advantage of the mutual compatibility afforded by the combination of ingredients when in the form of an additive concentrate. Also, the use of a concentrate may reduce blending time and may lessen the possibility of blending errors.

The present disclosure provides novel lubricating oil blends specifically formulated for use as automotive engine lubricants. Embodiments of the present disclosure may provide lubricating oils suitable for engine applications that provide improvements in one or more of the following characteristics: antioxidancy, antiwear performance, rust inhibition, fuel economy, water tolerance, air entrainment, seal protection, and foam reducing properties.

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise or apparent from the context of discussion, all percentages, ratios, and parts noted in this disclosure are by weight.

EXAMPLES

Materials and Methods

The reactions described herein were generally performed in a 500 mL flask with overhead stirring, a water removal condenser, temperature probe, and nitrogen supply. When necessary, the reactions were heated using an isomantle.

General Synthetic Strategy for an Acylated Olefin Copolymer

The dispersant olefin copolymer viscosity modifiers of the present disclosure can be prepared by the procedure pictured in Scheme 1 below. Specifically, an olefin copolymer is grafted with an acylating agent (for example, maleic anhydride (Sigma Aldrich)). The acyl grafting may be accomplished with an appropriate technique known to those having skill in the art, such as using carbon radicals produced from an olefin bond using a radical initiator, such as dicumyl peroxide (Sigma Aldrich). Other radical initiators are known to those having skill in the art. The grafted acid or anhydride can then undergo coupling chemistry (in the case of an acid) or a dehydration reaction (in the case of an anhydride) with a polyamine compound as described herein. The amines can then be capped with an oxazoline (available from Sigma Aldrich) of Formula I, wherein $R_1$, $R_2$, and $R_3$ are defined herein and generally shown below.

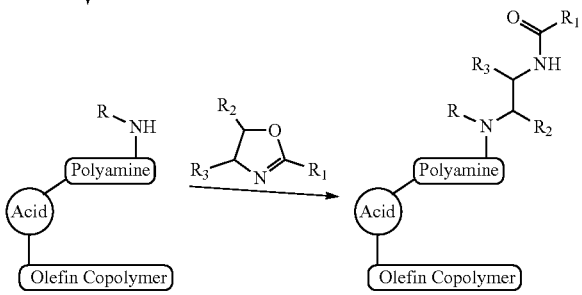

Comparative Example 1

Preparation of a highly grafted multifunctional medium molecular weight viscosity modifier (Comparative Polymer 1):

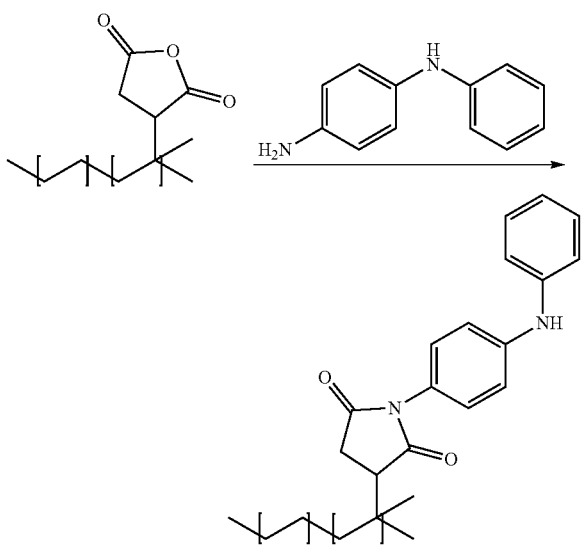

An acylated ethylene-propylene copolymer having an average molecular weight of approximately 40,000 $M_n$ was obtained by a grafting reaction of maleic anhydride to the ethylene-propylene copolymer. The reaction stoichiometry and reaction conditions were such that allowed 8.2 molecules of maleic anhydride to be grafted on the olefin copolymer backbone or about 0.41 carboxylic groups per 1,000 Mn of the polymer backbone (i.e. 2×8.2=16.4 carboxylic groups/40,000 Mn=0.41 carboxylic groups/1000 Mn).

The acylated ethylene-propylene copolymer was reacted with a molar excess of n-phenyl-1,4-phenylene diamine (NPPDA, Flexsys) relative to the grafted acyl groups, in the presence of a surfactant, at about 160° C. for approximately six hours (a suitable surfactant may be Surfonic (Huntsmen), typically at 3 wt %). For color stabilization, the reaction mixture containing the imide product was combined with an aldehyde for 4 hours. The final polymer was diluted with 110N oil to have a 12 wt % polymer content. The reaction was allowed to cool to about 130° C. and filtered through a 100 mesh (140 μm) filter. The product was allowed to cool to room temperature and tested for viscometric and dispersant properties.

Comparative Example 2

Preparation of a highly grafted multifunctional high molecular weight viscosity modifier (Comparative Polymer 2). Higher molecular weight multifunctional olefin copolymers were prepared by the same general method previously described in the literature and as set forth in Comparative Example 1.

An acylated ethylene-propylene copolymer having an average molecular weight of approximately 56,000 $M_n$ was obtained by grafting maleic anhydride to an ethylene-propylene copolymer. The reaction stoichiometry and reaction conditions were such that allowed 11.4 molecules of maleic anhydride to be grafted onto the olefin copolymer backbone or about 0.41 carboxylic groups per 1,000 Mn of the polymer backbone (i.e. 2×11.4=22.8 carboxylic groups/56,000 Mn=0.41 carboxylic groups/1000 Mn). The acylated ethylene-propylene copolymer was reacted with a molar excess of N-phenyl-1,4-phenylene diamine (NPPDA) relative to the grafted acyl groups, in the presence of a surfactant (similar to Comparative Example 1), at about 160° C. for approximately six hours. For color stabilization, the reaction mixture containing the imine product was combined with an aldehyde for 4 hours. The final polymer was diluted with 110N oil to have a 12 wt % polymer content. The reaction was allowed to cool to about 130° C. and filtered through a 100 mesh (140 μm) filter. The product was allowed to cool to room temperature and tested for viscometric and dispersant properties.

Example 1

Post functionalization of a highly grafted multifunctional medium molecular weight viscosity modifier (Inventive Polymer 1) with 2-phenyl-2-oxazoline.

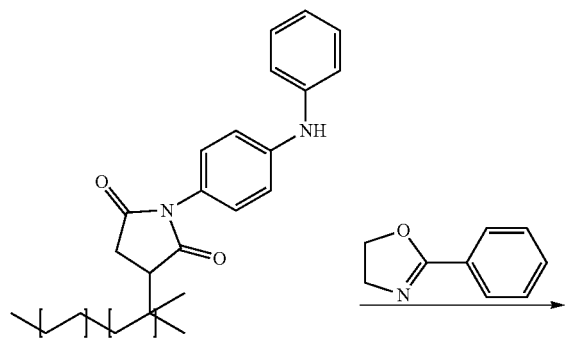

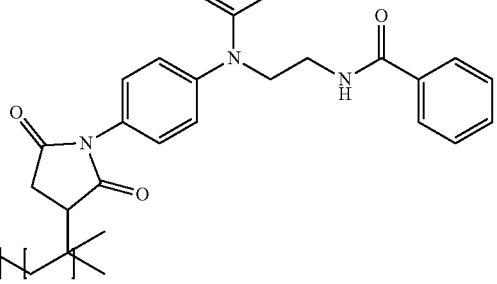

To a 4 neck, 2,000 mL resin kettle equipped with a heating mantle, a pitched 3 blade overhead stirrer, a thermocouple, a nitrogen inlet, a nitrogen outlet and condenser, was added 298.71 grams of Comparative Polymer 1 from Comparative Example 1. The reaction temperature was raised to about 130° C. and maintained under constant nitrogen flow. To the mixture, 2-phenyl-2-oxazoline (Sigma Aldrich, 1.3 g, 8.83 mmol) was added and the reaction was held for 4 hours and then filtered through a 100 mesh (140 μm) filter. The product was allowed to cool to room temperature and was tested for viscometric and dispersant properties.

The resulting polymer was subject to two dissolution iterations comprising one addition of an equivalent weight of heptane, followed by precipitation with ten equivalents of acetone. The polymer was thoroughly dried of acetone and finished drying in vacuo. The grafting efficiency was characterized by changes in IR spectra, molecular weight by GPC and nitrogen content of the polymer.

Example 2

Post functionalization of highly grafted multifunctional high molecular weight viscosity modifier (Inventive Polymer 2) with 2-phenyl-2-oxazoline.

To a 4 neck, 2000 mL resin kettle equipped with a heating mantle, a pitched 3 blade overhead stirrer, a thermocouple, a nitrogen inlet, a nitrogen outlet, and condenser, was added about 298.71 grams of Comparative Polymer 2 from Comparative Example 2. The reaction temperature was raised to about 130° C. and maintained under constant nitrogen flow. To the mixture, 2-phenyl-2-oxazoline was added (Sigma Aldrich, 1.3 g, 8.83 mmol) and the reaction was held for 4 hours and then filtered through a 100 mesh (140 μm) filter. The product was allowed to cool to room temperature and tested for viscometric and dispersant properties.

The resulting polymer was subject to two dissolution iterations comprising one addition of an equivalent weight of heptane, followed by precipitation with ten equivalents of acetone. The polymer was thoroughly dried of acetone and finished drying in vacuo. The grafting efficiency was characterized by changes in IR spectra, molecular weight by GPC and nitrogen content of the polymer.

Example 3

Post functionalization of highly grafted multifunctional high molecular weight viscosity modifier (Inventive Polymer 3) with 2-ethyl-2-oxazoline.

To a 4 neck, 2000 mL resin kettle equipped with a heating mantle, a pitched 3 blade overhead stirrer, a thermocouple, a nitrogen inlet, a nitrogen outlet, and condenser, was added about 299.16 grams of Comparative Polymer 2 from Comparative Example 2. The reaction temperature was raised to about 130° C. and maintained under constant nitrogen flow. To the mixture 2-ethyl-2-oxazoline was added (Sigma Aldrich, 0.87 g, 8.77 mmol) and the reaction was held for 4 hours and then filtered through a 100 mesh (140 µm) filter. The product was allowed to cool to room temperature and tested for viscometric and dispersant properties.

The resulting polymer was subject to two dissolution iterations comprising one addition of an equivalent weight of heptane, followed by precipitation with ten equivalents of acetone. The polymer was thoroughly dried of acetone and finished drying in vacuo. The grafting efficiency was characterized by changes in IR spectra, molecular weight by GPC and nitrogen content of the polymer.

Example 4

Post functionalization of highly grafted multifunctional high molecular weight viscosity modifier (Inventive Polymer 4) with 2-ethyl-2-oxazoline.

To a 4 neck, 2000 mL resin kettle equipped with a heating mantle, a pitched 3 blade overhead stirrer, a thermocouple, a nitrogen inlet, nitrogen outlet and condenser was added about 299.16 grams of Comparative Polymer 2 from Comparative Example 2. The reaction temperature was raised to about 130° C. and maintained under constant nitrogen flow. To the mixture 2-ethyl-2-oxazoline (0.87 g, 8.77 mmol) and Amberlyst 15 (0.10 g-acid catalyst to aid in capping efficiency) were added and the reaction was held for about 4 hours and then filtered through a 100 mesh (140 µm) filter. The product was allowed to cool to room temperature and tested for viscometric and dispersant properties.

The resulting polymer was subject to two dissolution iterations comprised one equivalent weigh of heptane addition followed by precipitation ten equivalences of acetone. The polymer thoroughly dried of acetone and finished drying in vacuo. The grafting efficiency was characterized by changes in IR spectra, molecular weight by GPC and nitrogen content of the polymer.

Example 5

This Example evaluates the dispersant performance of a lubricating oil including capped and uncapped additives of the above Comparative and Inventive Examples.

The performance of the example polymers and comparative example polymers in a lubricating oil is provided in FIG. 1. The results of dispersancy testing and a final value of the effective concentration for each of the example polymers are provided in Table 3 below. The effective concentration shown in Table 3 is the minimum amount of polymer needed to completely disperse soot at which point the rheological profiles become flat or Newtonian. The actual amount used in a lubricant may be higher depending on other properties desired for the lubricant.

TABLE 3

Effective Concentration of Dispersant Performance

| Functional Polymer | Effective Concentration (E.C.) |
|---|---|
| Comparative Polymer 1 | 1.4 |
| Comparative Polymer 2 | 0.65 |
| Inventive Polymer 1 | 1.11 |
| Inventive Polymer 2 | 0.55 |
| Inventive Polymer 3 | 0.39 |
| Inventive Polymer 4 | 0.41 |

As shown in Table 3 above, the inventive, capped polymers all had improved dispersency as compared to the uncapped versions of the same polymer. Inventive Polymer 1 was the capped version of Comparative Polymer 1. The effective or minimum concentration to disperse soot of inventive, capped polymer 1 was about 20 percent lower than its uncapped polymer. Likewise, Inventive Polymers 2, 3, and 4 were capped versions of Comparative Polymer 2. The effective or minimum concentration to disperse soot of the Inventive, capped Polymers 2, 3, and 4 was 15, 40, and 36 percent lower, respectively, than the uncapped versions of this polymer (that is, the inventive polymers require about 15 to about 40 percent less polymer to achieve soot dispersancy.)

More particularly, the above results of capped, Inventive Polymers 2, 3, and 4 demonstrate improved soot dispersancy at reduced polymer treat rates relative to the uncapped versions of the same polymers of Comparative Polymers 2 as shown in FIG. 1. This particular feature brings one advantage by increasing formulation windows as well as the economic aspect of reduced treat rates.

In order to evaluate lubricant formulations according to this disclosure, the invented polymers were tested for their ability to disperse soot. Without dispersant, an oil containing soot particles has a shear thinning (non-Newtonian) behavior where viscosity decreases with increasing shear rate due to the agglomeration of soot particles at low shear rate resulting in high viscosity, while at higher shear rate, soot particle agglomeration was broken up resulting in low viscosity. If an additive with dispersant capability is added to a sooted oil, the soot particles are protected by the dispersant without agglomeration, thus the oil has an ideally viscous or Newtonian fluid behavior where viscosity is independent of shear rate. (See, e.g., Thomas G. Mezger, The Rheology Handbook, 3rd Revised Edition, 2011, portions thereof are incorporated herein by reference.) Based on this, a dispersancy test was designed to test effectiveness of the inventive polymers to disperse soot particles using a Physica MCR 301 Rheometer (Anton Parr). A sooted oil have about 4.6 weight percent soot was generated from a fired diesel engine using a fluid that contains no dispersants. The sooted oil was then top treated with a certain amount of Inventive and Comparative Polymers and then tested by a shear rate sweep in a rheometer with a cone on plate to look for Newtonian/non-Newtonian behavior. Test temperature is about 100° C. and the test top plate is CP50-1 (Anton Parr). A profile of viscosity and shear rate was recorded, and the results may be seen in FIG. 1.

In FIG. 1, the curve labeled "Sooted Oil alone" represents the viscosity versus shear rate curve before addition of any dispersants, and a shear thinning behavior was observed as expected since soot particles are agglomerated together. Comparative Example 2 (not capped or treated with oxazoline) showed a curve of decreasing viscosity with increasing shear rate at 0.4 wt %, which means that it is a shear thinning (non-Newtonian) fluid and the soot is agglomerating. The higher viscosity indicates at this treat rate, the Comparative Example 2 polymer was effectively acting as a thickener increasing the oil viscosity but not dispersing the soot particles. The higher viscosity at lower shear is a sign of soot agglomeration. The Inventive Polymers 2, 3, 4, from Example 2, 3, and 4, on the other hand, are capped versions of Comparative Polymer 2 and exhibited relatively constant viscosity versus shear rate at 0.4 weight percent treat rates.

In FIG. 1, the amounts of polymer tested ranged between 0.2 and 0.6 weight percent depending on the polymer, and more specifically, the treat rates of the polymers were as follows: 0.2 wt % (Example 2), 0.3 wt % (Example 3), 0.4 wt % (Example 4), and 0.6 wt % (Comparative Example 2). Furthermore, the viscosities for Inventive Polymers 2, 3, and 4 at low shear are lower than the curve for Comparative Example 2. These results show that the Inventive Polymers effectively disperse the soot particles at the treat rate used.

Example 6: Elastomer Compatibility Performance Test

Seal performance testing is a screening procedure used to assess the impact of various lubricant components on the lifetime of engine fluro-elastomer seals. Fluoro elastomer performance testing is based on ASTM D471 12a, ASTM 412 06a, ASTM D2240 05, and ASTM D5662 14, which are incorporated herein by reference. Depending on the chemical nature and size of the additive or polymeric components, these may diffuse in and/or interact with the elastomers, thereby decreasing their lifetime. Lowering the treat rate may cause some benefits associated with higher treat rates to be lost.

Table 4 below summarizes functional polymer performance at various treat rates (2 to 10 wt %) with a heavy duty diesel DI pack treat (8.0 wt %) in 6 Star Motiva base oil. Two main features of the mechanical test are the average elongation at rupture (avg. ER) and the average tensile strength (avg. TS). Values must be greater than 55% for avg. ER and greater than 50% for average TS. At all tested treat rates, Comparative Polymer 2 (uncapped polymer) failed both the average ER and the average TS tests, while all Inventive Polymers of an oxazoline functionalized samples (Polymers 2, 3, and 4) passed every concentration tested.

TABLE 4

Average Elongation Rupture (ER) and Tensile Strength (TS) for the example polymers

| | | Seal Performance | |
|---|---|---|---|
| Functional Polymer | Treat Rate (wt %) | Avg ER % (pass > −55%) | Avg TS % (pass > −50%) |
| Comparative Polymer 2 | 2.0 | −57.5 | −53.5 |
| Comparative Polymer 2 | 5.0 | −59.9 | −58.9 |
| Comparative Polymer 2 | 10.0 | −62.2 | −59.7 |
| Inventive Polymer 2 | 2.0 | −49.4 | −44.8 |
| Inventive Polymer 2 | 5.0 | −50.8 | −46.8 |
| Inventive Polymer 2 | 10.0 | −50.1 | −46.4 |
| Inventive Polymer 3 | 2.0 | −45.0 | −40.8 |
| Inventive Polymer 3 | 5.0 | −45.1 | −42.1 |
| Inventive Polymer 3 | 10.0 | −46.8 | −42.6 |
| Inventive Polymer 4 | 2.0 | −42.9 | −40.6 |
| Inventive Polymer 4 | 5.0 | −43.7 | −40.1 |
| Inventive Polymer 4 | 10.0 | −41.5 | −39.5 |

As provided in the examples and resulting data above, the oxazoline modified functional viscosity modifiers of the present disclosure (Examples 1-4 and polymers 1-4) not only unexpectedly increased the dispersant performance of the additive, but also provided increased protection of fluoro-elastomer seals relative to the same uncapped polymer.

It is to be understood that while the additives and lubricant of this disclosure have been described in conjunction with the detailed description thereof and summary herein, the foregoing description is intended to illustrate and not limit the scope of the disclosure, which is defined by the scope of the appended claims. Other aspects, advantages, and modifications are within the scope of the claims. It is intended that the specification and examples be considered as exemplary only, with a true scope of the disclosure being indicated by the following claims.

What is claimed is:

1. A multi-functional olefin copolymer viscosity modifier comprising the reaction product of (i) an amine-functionalized acylated olefin copolymer including one or more primary and/or secondary aryl amines, one or more primary and/or secondary alkyl amines, or mixtures thereof and (ii) an oxazoline or derivative thereof; and wherein the oxazoline or derivative thereof is a capping agent for a nitrogen of the primary and/or secondary amines.

2. The multi-functional olefin copolymer viscosity modifier of claim 1, wherein the one or more primary and/or secondary aryl amines include a sterically hindered nitrogen.

3. The multi-functional olefin copolymer viscosity modifier of claim 1, wherein the oxazoline or derivative thereof is selected from 2-phenyl-2-oxazoline; 2-ethyl-2 oxazoline; 2-methyl-2-oxazoline; 2-benzyl-4,4-dimethyl-2-oxazoline; 2-ethyl-4,4-dimethyl-2 oxazoline; 2,4,4-trimethyl-2-oxazoline; 4,4-dimethyl-2-oxazoline; 2,4,5-trimethyl-3-oxazoline; 2-(2,6-dimethoxyphenyl)-4,4-dimethyl-2-oxazoline; 2-[1-(hydroxymethyl)ethyl] oxazoline; mixtures thereof, and derivatives thereof.

4. The multi-functional olefin copolymer viscosity modifier of claim 1, wherein the oxazoline or derivative thereof includes pendant groups in positions 2, 4, and 5 or combinations thereof and wherein the pendant groups are selected from heterocyclic aromatics, hydrocarbyl groups of $C_1$ to $C_{32}$, and mixtures thereof.

5. The multi-functional olefin copolymer viscosity modifier of claim 1, wherein the reaction product has a capping ratio of about 5 to about 50 percent of the primary and/or secondary amines.

6. The multi-functional olefin copolymer viscosity modifier of claim 1, wherein the amine-functionalized acylated olefin copolymer has about 0.1 to about 0.8 carboxylic groups per about 1000 number average molecular weight units of the olefin copolymer and wherein the olefin copolymer has a number average molecular weight of about 5,000 to about 150,000.

7. The multi-functional olefin copolymer viscosity modifier of claim 1, wherein the olefin copolymer is a copolymer of ethylene and one or more of C3 to C18 alpha-olefins.

8. The multi-functional olefin copolymer viscosity modifier of claim 1, wherein the amine-functionalization is obtained from an N-arylphenylenediamine of the formula $$R_4 \text{—} \underset{}{\bigcirc} \text{—} \underset{H}{N} \text{—} \underset{R_6}{\overset{R_5}{\bigcirc}}$$

$R_4$ is hydrogen, —NH-aryl, —NH-arylalkyl, —NH-alkyl, or a branched or straight chain radical having from 4 to 24 carbon atoms that can be alkyl, alkenyl, alkoxyl aralkyl, alkaryl, hydroxyalkyl or aminoalkyl; $R_5$ is —NH$_2$, CH$_2$—(CH$_2$), —NH$_2$, CH$_2$-aryl-NH$_2$, in which n is an integer from 1 to 10; and $R_6$ is hydrogen, alkyl, alkenyl, alkoxyl, aralkyl, alkaryl having from 4 to 24 carbon atoms.

9. The multi-functional olefin copolymer viscosity modifier of claim 8, wherein the N-arylphenylenediamine is selected from N-phenyl-1,4-phenylenediamine; N-phenyl-1,3-phenylendiamine; N-phenyl-1,2-phenylenediamine; and mixtures thereof.

10. The multi-functional olefin copolymer viscosity modifier of claim 1, wherein the acylated olefin copolymer is derived from a copolymer of ethylene and one or more C3 to C18 alpha-olefins and a grafted ethylenically unsaturated carboxylic acid material having at least one ethylenic bond and at least one carboxylic acid group or anhydride group thereof or a polar group that is convertible into a carboxyl group reacted with the olefin copolymer.

11. The multi-functional olefin copolymer viscosity modifier of claim 10 wherein the ethylenically unsaturated carboxylic acid material is selected from acrylic acid, methacrylate acid, cinnamic acid, crotonic acid, maleic acid, fumaric acid or anhydride derivatives thereof.

12. An additive concentrate comprising the multi-functional olefin copolymer viscosity modifier of claim 1.

13. A lubricant comprising:
a major amount of base oil of lubricating viscosity; and
a minor amount of a multi-functional olefin copolymer viscosity modifier comprising the reaction product of (i) an amine-functionalized acylated olefin copolymer including one or more primary and/or secondary aryl amines, one or more primary and/or secondary alkyl amines, or mixtures thereof and (ii) an oxazoline or derivative thereof and wherein the oxazoline or derivative thereof is a capping agent for a nitrogen of the primary and/or secondary amines.

14. The lubricant of claim 13, wherein the one or more primary and/or secondary aryl amines include a sterically hindered nitrogen.

15. The lubricant of claim 13, wherein the oxazoline or derivative thereof is selected from 2-phenyl-2-oxazoline; 2-ethyl-2 oxazoline; 2-methyl-2-oxazoline; 2-benzyl-4,4-dimethyl-2-oxazoline; 2-ethyl-4,4-dimethyl-2 oxazoline; 2,4,4-trimethyl-2-oxazoline; 4,4-dimethyl-2-oxazoline; 2,4,5-trimethyl-3-oxazoline; 2-(2,6-dimethoxyphenyl)-4,4-dimethyl-2-oxazoline; 2-[1-(hydroxymethyl)ethyl] oxazoline; mixtures thereof, and derivatives thereof.

16. The lubricant of claim 13, wherein the oxazoline or derivative thereof includes pendant groups in positions 2, 4, and 5 or combinations thereof and wherein the pendant groups are selected from heterocyclic aromatics, hydrocarbyl groups $C_1$ to $C_{32}$, and mixtures thereof.

17. The lubricant of claim 13, wherein the reaction product has a capping ratio of about 5 to about 50 percent of the primary and/or secondary amines.

18. The lubricant of claim 13, wherein the amine-functionalized acylated olefin copolymer has about 0.1 to about 0.8 carboxylic groups per about 1000 number average molecular weight units of the olefin copolymer and wherein the olefin copolymer has a number average molecular weight of about 5,000 to about 150,000.

19. The lubricant of claim 13, wherein the olefin copolymer is a copolymer of ethylene and one or more of C3 to C18 alpha-olefins.

20. The lubricant of claim 13, wherein the amine-functionalization is obtained from an N-arylphenylenediamine of the formula

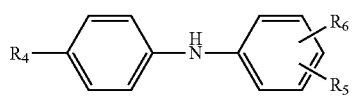

$R_4$ is hydrogen, —NH-aryl, —NH-arylalkyl, —NH-alkyl, or a branched or straight chain radical having from 4 to 24 carbon atoms that can be alkyl, alkenyl, alkoxyl aralkyl, alkaryl, hydroxyalkyl or aminoalkyl; $R_5$ is —NH$_2$, CH$_2$—(CH$_2$), —NH$_2$, CH$_2$-aryl-NH$_2$, in which n is an integer from 1 to 10; and $R_6$ is hydrogen, alkyl, alkenyl, alkoxyl, aralkyl, alkaryl having from 4 to 24 carbon atoms.

21. The lubricant of claim 20, wherein the N-arylphenylenediamine is selected from N-phenyl-1,4-phenylenediamine; N-phenyl-1,3-phenylendiamine; N-phenyl-1,2-phenylenediamine; and mixtures thereof.

22. The lubricant of claim 13, wherein the acylated olefin copolymer is derived from a copolymer of ethylene and one or more C3 to C18 alpha-olefins and a grafted ethylenically unsaturated carboxylic acid material having at least one ethylenic bond and at least one carboxylic acid group or anhydride group thereof or a polar group that is convertible into a carboxyl group reacted with the olefin copolymer.

23. The lubricant of claim 22, wherein the ethylenically unsaturated carboxylic acid material is selected from acrylic acid, methacrylate acid, cinnamic acid, crotonic acid, maleic acid, fumaric acid or anhydride derivatives thereof.

* * * * *